(12) United States Patent
Gotoh et al.

(10) Patent No.: US 9,499,159 B2
(45) Date of Patent: Nov. 22, 2016

(54) VEHICLE CONTROL APPARATUS

(71) Applicant: DENSO CORPORATION, Kariya, Aichi-pref. (JP)

(72) Inventors: Mutsuaki Gotoh, Chita-gun (JP); Takashi Satoh, Okazaki (JP); Masanori Sugiura, Chiryu (JP); Mitsuharu Higashitani, Anjo (JP); Mamoru Mabuchi, Kariya (JP); Motoyoshi Hatta, Kariya (JP)

(73) Assignee: DENSO CORPORATION, Kariya (JP)

( * ) Notice: Subject to any disclaimer, the term of this patent is extended or adjusted under 35 U.S.C. 154(b) by 287 days.

(21) Appl. No.: 14/457,183

(22) Filed: Aug. 12, 2014

(65) Prior Publication Data

US 2015/0051775 A1    Feb. 19, 2015

(30) Foreign Application Priority Data

Aug. 19, 2013 (JP) ................. 2013-169549
Oct. 18, 2013 (JP) ................. 2013-217120

(51) Int. Cl.
*B60W 20/00* (2016.01)
*B60W 10/06* (2006.01)
*B60W 10/08* (2006.01)
(Continued)

(52) U.S. Cl.
CPC .............. *B60W 20/108* (2013.01); *B60K 6/48* (2013.01); *B60W 10/06* (2013.01); *B60W 10/08* (2013.01); *B60W 10/26* (2013.01); *B60W 20/11* (2016.01); *B60W 20/13* (2016.01); *Y02T 10/6221* (2013.01); *Y02T 10/6286* (2013.01); *Y10S 903/93* (2013.01)

(58) Field of Classification Search
CPC .. B60W 20/108; B60W 10/08; B60W 10/26; B60W 20/10; B60W 20/11; B60W 20/13; B60K 6/48
See application file for complete search history.

(56) References Cited

U.S. PATENT DOCUMENTS

| 5,841,201 A | * | 11/1998 | Tabata | B60K 6/365 180/65.25 |
| 5,935,040 A | * | 8/1999 | Tabata | B60K 6/365 180/65.25 |
| 6,123,163 A | * | 9/2000 | Otsu | B60K 6/36 180/65.25 |

(Continued)

FOREIGN PATENT DOCUMENTS

| JP | 2004-249900 | 9/2004 |
| JP | 3901235 | 1/2007 |
| JP | 2010-158966 | 7/2010 |

OTHER PUBLICATIONS

Gotoh, et al., U.S. Appl. No. 14/457,224, filed Aug. 12, 2014.
(Continued)

*Primary Examiner* — Mussa A Shaawat
(74) *Attorney, Agent, or Firm* — Nixon & Vanderhye P.C.

(57) ABSTRACT

A vehicle control apparatus uses a travel mode selection unit to select between an EV travel mode, an engine travel mode, and an engine generation mode depending on comparisons between an engine generated power cost, an EV effect, and a surplus electric energy. In such manner, according to a travel condition of a vehicle, an appropriate travel mode is selected for an improvement of fuel consumption efficiency. The vehicle control apparatus also computes a fuel consumption decrease or a fuel consumption increase for each of a plurality of travel modes based on an engine efficiency and an MG-INV efficiency. In such manner, fuel consumption increase/decrease for every travel mode may be computed.

11 Claims, 21 Drawing Sheets

(51) Int. Cl.
   *B60W 10/26*   (2006.01)
   *B60K 6/48*   (2007.10)

(56) References Cited

U.S. PATENT DOCUMENTS

| | | | | |
|---|---|---|---|---|
| 6,672,415 B1* | 1/2004 | Tabata | ............ | B60K 6/365 |
| | | | | 180/65.25 |
| 2004/0164616 A1 | 8/2004 | Obayashi et al. | | |
| 2006/0113129 A1* | 6/2006 | Tabata | ............ | B60K 6/365 |
| | | | | 180/65.25 |
| 2007/0145924 A1 | 6/2007 | Obayashi | | |
| 2007/0205030 A1 | 9/2007 | Shibata et al. | | |
| 2007/0298928 A1* | 12/2007 | Yamanaka | ............ | B60K 6/40 |
| | | | | 477/15 |
| 2009/0024262 A1* | 1/2009 | Amamiya | ............ | B60K 6/445 |
| | | | | 701/22 |
| 2012/0292919 A1* | 11/2012 | Suzuki | ............ | B60K 6/48 |
| | | | | 290/38 C |
| 2014/0051546 A1* | 2/2014 | Maruyama | ............ | B60K 6/442 |
| | | | | 477/5 |
| 2014/0100730 A1* | 4/2014 | Park | ............ | B60W 10/06 |
| | | | | 701/22 |
| 2015/0006000 A1* | 1/2015 | Kawata | ............ | B60K 6/48 |
| | | | | 701/22 |

OTHER PUBLICATIONS

U.S. Appl. No. 14/457,224, filed Aug. 12, 2014, Vehicle Control Apparatus.
U.S. Appl. No. 14/457,183, filed Aug. 12, 2014, Vehicle Control Apparatus.

* cited by examiner

VEHICLE SPEED

REQUESTED DRIVE POWER

MG POWER

SURPLUS
ELECTRIC ENERGY
SHORTAGE

VEHICLE SPEED

REQUESTED DRIVE POWER

MG POWER

VEHICLE CONTROL APPARATUS

CROSS REFERENCE TO RELATED APPLICATION

The present application is based on and claims the benefit of priority of Japanese Patent Applications No. 2013-169549, filed on Aug. 19, 2013, and No. 2013-217120, filed on Oct. 18, 2013, the disclosure of which are incorporated herein by reference.

TECHNICAL FIELD

The present disclosure generally relates to a vehicle control apparatus which controls a hybrid vehicle.

BACKGROUND INFORMATION

In recent years, hybrid vehicles powered by an engine and a motor have become popular due to environmental requirements such as low fuel consumption and low exhaust gas emission. Hybrid vehicles may have several driving modes from which to switch between including (i) an engine travel mode, in which the vehicle travels on a drive power from an engine, (ii) an EV travel mode, in which the vehicle travels on a drive power from a motor generator, (iii) an MG assist mode, in which the vehicle travels on a driver power from both of the engine and the motor generator, and (iv) an engine generation mode, in which the engine is driven to a more-than-required level, i.e., to drive both of the vehicle and the motor generator, which is used for generating electricity.

For example, in a patent document 1 (i.e., Japanese Patent Document No. 3901235), the start and stop of the engine are switched according to a depression amount of an accelerator pedal or a brake pedal.

However, the system in patent document 1 does not take an efficiency of the engine into account, for example. As a result, such a switching scheme of the drive modes may not necessarily yield the best result in terms of fuel efficiency and other factors.

Further, for example, in a patent document 2 (i.e., Japanese Patent Laid-Open No. JP-2007-176270A), an operation of the motor generator for generating electricity and an operation of the motor generator for driving the vehicle are compared with each other, in order to determine which one of those two operations creates greater economic benefits than the other. Then, based on a comparison result, an instruction command for operating the motor generator in a more economic mode is sent to the motor generator.

However, the patent document 2 is silent about the economic benefits of the EV travel mode in which the vehicle travels only on drive power from the motor generator but not drive power from the engine.

SUMMARY

It is an object of the present disclosure to provide a vehicle control apparatus that is capable of selecting a best travel mode and calculating a per-unit-electric-power fuel consumption decrease or increase for a plurality of travel modes.

In an aspect of the present disclosure, a vehicle control apparatus for controlling a hybrid vehicle includes a requested drive power calculator calculating a requested drive power based on driver operation information and vehicle speed information. The vehicle control apparatus also has a travel mode selector selecting one of plural travel modes as a travel mode of the hybrid vehicle, the travel modes that includes an EV travel mode in which the requested drive power is output from the motor generator, an engine travel mode in which the requested drive power is output from the engine, and an engine generation mode in which the requested drive power is output from the engine while the engine drives the motor generator. A fuel consumption decrease effect, which is an EV effect that is calculated based on (i) a fuel consumption decrease amount and (ii) a consumed electric power when the motor generator outputs the requested drive power. A fuel consumption increase cost, which is an engine generated power cost that is calculated based on (i) a fuel consumption increase amount and (ii) a charge electric power when the engine drives the motor generator to generate an electric power. Then, the travel mode selector selects the EV travel mode as the travel mode of the hybrid vehicle when the fuel consumption decrease effect is greater than the fuel consumption increase cost, the EV travel mode as the travel mode of the hybrid vehicle when the engine generated power cost is equal to or greater than the EV effect and a surplus electric energy is available, or one of the engine travel mode and the engine generation mode when the engine generated power cost is equal to or greater than the EV effect and no surplus electric energy is available.

Further, the engine generated power cost is based on the requested drive power.

Additionally, the engine generated power cost is a maximum value when the requested drive power is within a preset range.

Even further, the engine generated power cost is a constant value based on an engine generated electric power that is constant, and the constant value is defined as a value that maintains a rate of change of the engine generated power cost versus the engine generated power below a predetermined value.

Moreover, surplus electric energy includes a predicted energy that is to be obtained from future deceleration regeneration electric power based on the vehicle speed information.

Still further, the travel mode selection unit selects the engine travel mode as the travel mode of the hybrid vehicle when (i) the engine generated power cost is equal to or greater than the EV effect and (ii) there is no surplus electric energy or no shortage of electric energy, and the travel mode selection unit selects the engine generation mode as the travel mode of the hybrid vehicle when (i) the engine generated power cost is equal to or greater than the EV effect and (ii) there is a shortage of electric energy.

In addition, the fuel consumption decrease amount for the calculation of the EV effect is calculated as an amount of fuel consumption based on an engine efficiency when the requested drive power is output from the engine, and the consumed electric power for the calculation of the EV effect is calculated based on the requested drive power and a motor generator efficiency.

Yet further, the fuel consumption increase amount for the calculation of the engine generated power cost is calculated based on an engine efficiency and as a difference between (i) an amount of fuel consumption when the requested drive power and the engine generated electric power for the drive of the motor generator are both output from the engine and (ii) an amount of fuel consumption when the requested drive power is output from the engine, and the charge electric power used to calculate the engine generated power cost is calculated based on the engine generated electric power and a motor generator efficiency.

Furthermore, the engine efficiency and an engine rotation number are calculated based on the output of the engine and ideal fuel consumption information of the engine, and the motor generator efficiency is determined based on a motor generator rotation number and the output of the motor generator.

Additionally, the hybrid vehicle has a transmission transmitting the drive power from the engine and the motor generator to a drive wheel, and an engine rotation number and the motor generator rotation number are set to rotate at a preset ratio.

Moreover, the transmission is a continuously variable transmission.

The travel mode selector selects the EV travel mode as a travel mode of the vehicle when (i) the engine generated power cost is equal to or greater than the EV effect and (ii) a surplus electric energy is available. Further, the travel mode selector selects either the engine travel mode or the engine generation mode as a travel mode of the vehicle when (i) the engine generated power cost is equal to or greater than the EV effect and (ii) a surplus electric energy is not available.

In the present disclosure about the travel mode selection, when it is determined that the EV effect is greater than the engine generated power cost based on a comparison therebetween, the EV travel mode is selected regardless of whether the surplus electric energy is available, because the travel of the hybrid vehicle by the drive power from the motor generator yields a better (i.e., smaller) fuel consumption rate, even when an engine power is used later to drive the motor generator for supplementing a shortage of the electric power.

Further, when it is determined that the engine generated power cost is equal to or greater than the EV effect, the EV travel mode may be selected when the surplus electric energy is available from regeneration of an electric power or the like, or, one of the engine travel mode or the engine generation mode may be selected when the surplus electric energy is not available.

In such manner, a travel mode is switched to an appropriate one according to the travel condition of the hybrid vehicle, thereby enabling an improvement of the fuel consumption rate.

In another aspect of the present disclosure, a vehicle control apparatus which controls a hybrid vehicle includes an engine, a motor generator, an electricity storage part, an inverter, and a transmission. When the motor generator is connected to the engine, a rotation number of the motor generator is set to have a certain ratio to a rotation number of the engine. The electricity storage part receives and sends an electric power from/to the motor generator. The inverter is disposed on a path between the electricity storage part and the motor generator. The transmission converts a drive power from the engine and/or from the motor generator, and transmits the converted power to drive wheels (i.e., tires) in various speeds.

The vehicle control apparatus further includes an engine efficiency calculator, a MG-INV efficiency calculator, and an electric power efficiency calculator.

The engine efficiency calculator calculates an engine efficiency based on ideal fuel consumption information and an engine power, which is a drive power output from the engine.

The MG-INV efficiency calculator calculates an MG-INV efficiency, which is a combined efficiency of the motor generator and the inverter based on an MG power, which is a drive power being output from the motor generator.

The power efficiency calculator calculates a per-unit-electric-power fuel consumption decrease or a per-unit-electric-power fuel consumption increase for travel modes based on the engine efficiency and the MG-INV efficiency.

Further, the electric power efficiency calculator calculates the fuel consumption decrease or the fuel consumption increase based at least on one of the engine efficiency, the MG-INV efficiency, an efficiency of the electricity storage part, an efficiency of the transmission, an efficiency of a load on an accessory device that is powered by the electricity storage part or an accessory power source, or an efficiency of a converter that converts the electric power supplied from the electricity storage part to the load on the accessory device.

In addition, the electric power efficiency calculator calculates at least one of an EV effect, which is the fuel consumption decrease when a travel mode is an EV travel mode, in which the MG power is output as a requested drive power that is calculated based on driver operation information and vehicle speed information, an MG assist effect, which is the fuel consumption decrease when the travel mode is an MG assist mode, in which the MG power and the engine power are output as the requested drive power, or an engine generation cost, which is the fuel consumption increase when the travel mode is an engine generation mode, in which the requested drive power is output as the engine power and the engine power is used to drive the motor generator to generate electricity.

Moreover, a travel mode selector selects one of the travel modes as the travel mode based on (i) a calculation of the EV effect and the MG assist effect by the electric power efficiency calculator and (ii) a comparison between the EV effect and the MG assist effect.

Even further, an MG rotation number is a number of rotations of the motor generator, and the MG-INV efficiency calculator calculates (i) the MG rotation number based on an engine rotation number that is derived from the engine power and the ideal fuel consumption information, and (ii) the MG-INV efficiency based on the MG rotation number and the MG power.

Still further, the transmission is a continuously variable transmission.

In the present disclosure, the per-unit-electric-power fuel consumption decrease or per-unit-electric-power fuel consumption increase is calculated for every travel mode based on the engine efficiency and the MG-INV efficiency. Further, the engine efficiency is calculated based on the engine power, and the MG-INV efficiency is calculated based on the MG power. Namely, if an operation equation for calculating the engine efficiency from the engine power and an operation equation for calculating the MG-INV efficiency from the MG power are known in advance, as a map for example, based on the engine power, the per-unit-electric-power fuel consumption decrease or per-unit-electric-power fuel consumption increase is appropriately computable. In such manner, as compared with a case where an actual vehicle is used for an actual measurement, fuel consumption increase/decrease for every travel mode is computable with a simpler configuration.

BRIEF DESCRIPTION OF THE DRAWINGS

Objects, features, and advantages of the present disclosure will become more apparent from the following detailed description made with reference to the accompanying drawings, in which.

DETAILED DESCRIPTION

Figure 1:
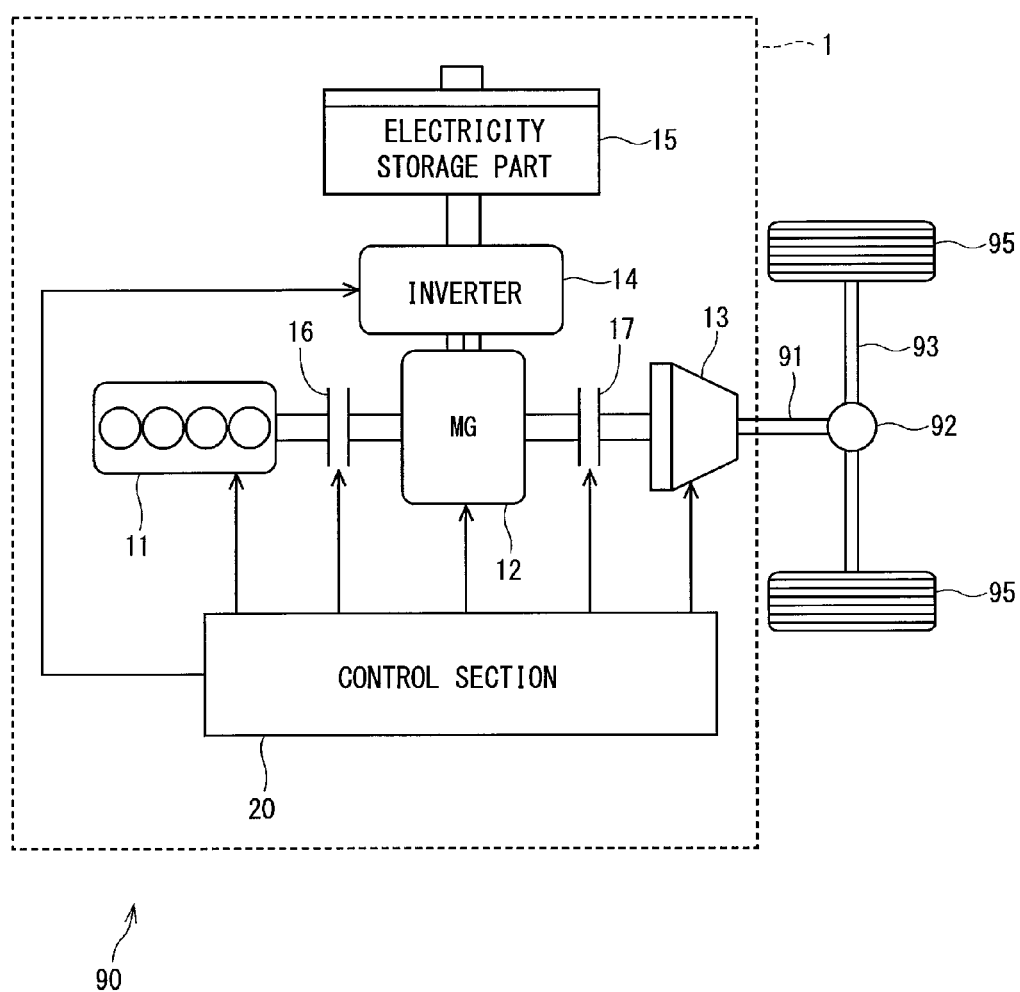
FIG. 1 is a block diagram of a vehicle control system in a first embodiment of the present disclosure.

Hereafter, the vehicle control apparatus by the present disclosure is described based on the drawing. Like numbers in the drawing represent like parts.

(First Embodiment)

The vehicle control apparatus in the first embodiment of the present disclosure is described based on FIGS. 1-16.

As shown in FIG. 1, a vehicle control system 1 includes an engine (ENG) 11, a motor generator (MG) 12, a transmission 13, an inverter (INV) 14, an electricity storage part 15, a first clutch 16, a second clutch 17, and a control section 20 as a vehicle control apparatus, together with other parts.

The engine 11 and the motor generator 12 constitute a drive power source of a vehicle 90 which is a hybrid vehicle. The engine 11 is an internal-combustion engine having multiple cylinders, and a drive power of the engine 11 is transmitted to the motor generator 12 via the first clutch 16.

The motor generator 12 serves as an electric motor for generating a torque by receiving an electric power from the electricity storage part 15 and by rotating, and also serves as a generator for generating electricity/electric power by receiving an engine torque from the engine 11 or by receiving a regenerative energy from braking of the vehicle 90.

An engine rotation number Neng, which is a number of rotations of the engine 11, and an MG rotation number Nmg, which is a number of rotations of the motor generator 12, are set to have a preset ratio when the first clutch 16 is connected. In the present embodiment, the ratio of the MG rotation number Nmg against the engine rotation number Neng is 1. That is, in the present embodiment, the engine rotation number Neng and the MG rotation number Nmg are equal to each other.

The drive power of the engine 11 and the motor generator 12 is transmitted to a drive shaft 91 via the second clutch 17 and the transmission 13. The drive power transmitted to the drive shaft 91 rotates a drive wheel 95 via a gear 92 and an axle 93. The transmission 13 of the present embodiment is a continuously variable transmission (CVT) which can continuously change speed, i.e., without going through a stepwise gear change.

The inverter 14 is disposed at a position between the motor generator 12 and the electricity storage part 15, and converts the electric power of the electricity storage part 15 into an AC electric power, and supplies it to the motor generator 12. Further, the inverter 14 converts the electric power generated by the motor generator 12 into a DC electric power, and supplies it to the electricity storage part 15.

The electricity storage part 15 is a rechargeable/secondary battery, such as a nickel hydride battery or a lithium ion battery, for example, and is set to be chargeable and dischargeable. The electricity storage part 15 is charged and discharged with its state of charge (SOC) maintained within a predetermined range. The electricity storage part 15 may be implemented as a device such as an electric double layer capacitor.

The first clutch 16 is disposed at a position between the engine 11 and the motor generator 12, and is set to connect and disconnect a connection between the engine 11 and the motor generator 12. The first clutch 16 is controlled by the control section 20 to disconnect the engine 11 from the motor generator 12 when a travel mode of the vehicle is in an EV travel mode which is mentioned later.

The second clutch 17 is disposed at a position between the motor generator 12 and the transmission 13, and is set to connect and disconnect the motor generator 12 and the transmission 13.

The control section 20 is implemented as a microcomputer or the like, and is provided with a CPU, ROM, RAM, I/O and a bus line for connecting those parts which are not illustrated. The control section 20 controls, through a software process by executing a program that is pre-memorized in the CPU and/or a hardware process by a dedicated electronic circuit, an entire vehicle 90 which is based on a control of the engine 11, the motor generator 12, the transmission 13, the inverter 14, the first clutch 16, and the second clutch 17 and the like.

Figure 2:
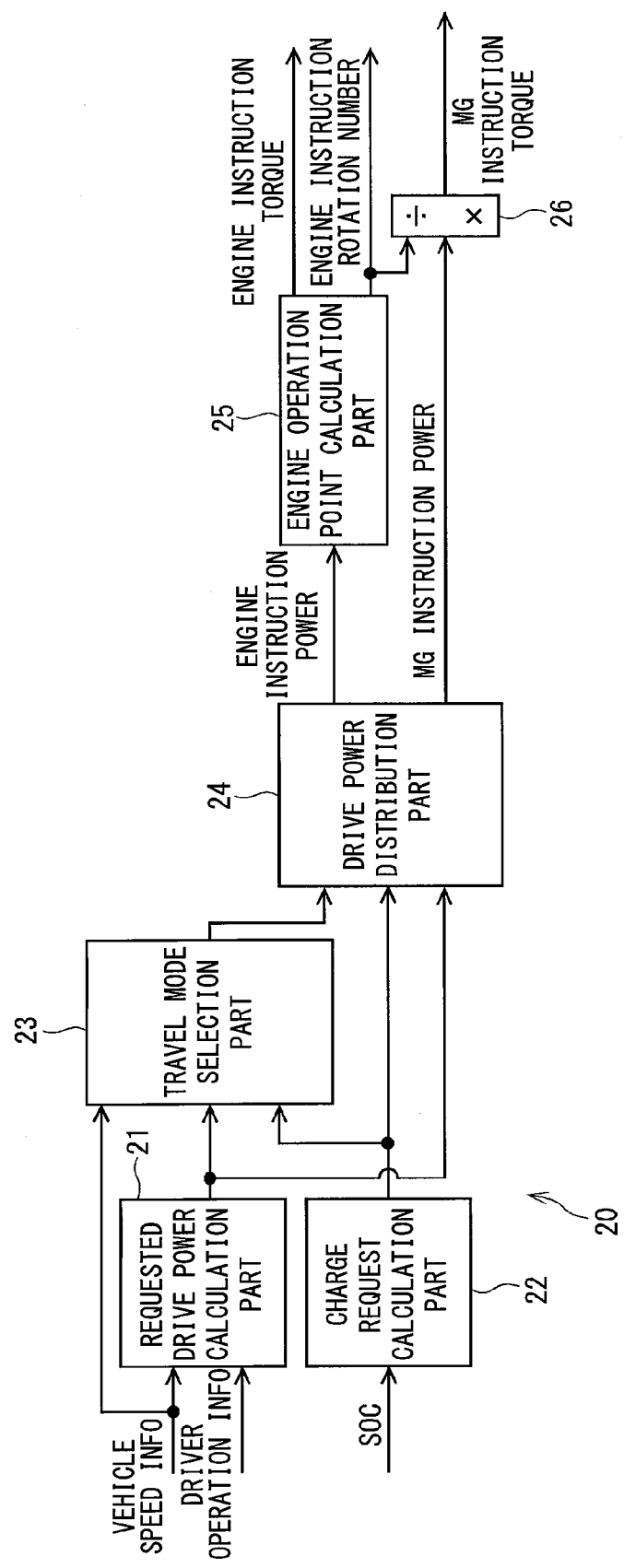
FIG. 2 is a block diagram of a vehicle control apparatus in the first embodiment of the present disclosure.

As shown in FIG. 2, the control section 20 has a requested drive power calculation part 21, a charge request calculation part 22, a travel mode selection part 23, a drive power distribution part 24, an engine operation point calculation part 25, and an MG instruction torque calculation part 26 and the like.

The requested drive power calculation part 21 obtains driver operation information, including an accelerator opening etc. and vehicle speed information about a travel speed of the vehicle 90, and computes a requested drive power Pdrv.

The charge request calculation part 22 computes whether a charge request exists based on an SOC of the electricity storage part 15.

The travel mode selection part 23 selects a travel mode. The travel mode may include: (i) an "engine travel mode" in which the vehicle travels by an engine power Peng which is a drive power outputted by the drive of the engine 11, (ii) an "EV travel mode" in which the vehicle travels by an MG power Pmg which is the drive power outputted by the drive of the motor generator 12, (iii) an "MG assist mode" in which the vehicle travels by the engine power Peng and the MG power Pmg, and (iv) an "engine generation mode" in which the vehicle travels by the engine power Peng and performs an electric power generation by the motor generator 12.

The MG assist mode is selected when, for example, the requested drive power Pdrv exceeds a high efficiency range for driving the engine 11 in an efficient manner. In such a case, the travel mode is set to the MG assist mode, and, by outputting a part of the requested drive power from the motor generator 12, the engine 11 is driven in the high efficiency range.

In the present embodiment, drive of the engine 11 and the motor generator 12 and connection/disconnection of the first clutch 16 are controlled based on the vehicle speed information, the requested drive power Pdrv, the charge request as well as the EV effect indicating a per-unit-electric-power fuel consumption reduction amount and the engine generated power cost indicating a per-unit-electric-power fuel consumption increase amount. Details of the EV effect, the engine generated power cost and a travel mode selection method are described later.

In the drive power distribution part 24, an engine instruction power and an MG instruction power are computed based on the requested drive power Pdrv and the existence of a charge request according to the travel mode. In the EV travel mode, the requested drive power Pdrv is entirely "distributed" to the MG instruction power. In the engine travel mode, the requested drive power Pdrv is entirely "distributed" to the engine instruction power.

In the engine operation point calculation part 25, an operation point (i.e., a number of rotations and a torque) of the engine 11 is computed based on the engine instruction power. Since the transmission 13 of the present embodiment is a continuously variable transmission and a gear ratio of such transmission can be freely and continuously set in a preset range, setting of the operation point of the engine 11 has a high degree of freedom. Therefore, in the present embodiment, the operation point of the engine 11 is controlled/brought to an ideal fuel consumption line Li by an adjustment of the engine power (see FIG. 3). That is, based on the engine instruction power, an engine instruction torque and an engine instruction rotation number are computed to have the operation point of the engine 11 on the ideal fuel consumption line Li. According to the present embodiment, the ideal fuel consumption line Li corresponds to "ideal fuel consumption information".

In the MG instruction torque calculation part 26, an MG instruction torque is computed based on the MG instruction power. Since the engine rotation number Neng is equal to the MG rotation number Nmg in the MG assist mode, an MG instruction rotation number is computed based on the engine instruction rotation number, and the MG instruction torque is computed based on the MG instruction rotation number and the MG instruction power.

Since the first clutch 16 disconnects the engine 11 and the motor generator 12 in the EV travel mode, the relationship between the engine rotation number Neng and the MG rotation number Nmg is lost. Therefore, for example, in outputting the MG power Pmg, the MG instruction torque is computed based on an operation point that maximizes an MG-INV efficiency $\eta$ ele, which is mentioned later. Further, the MG instruction torque may be so computed that the engine 11 and the motor generator 12 can shift appropriately to a clutch connected state in which the first clutch 16 connects the engine 11 and the motor generator 12.

Next, a calculation method of how to calculate a per-unit-electric-power fuel consumption decrease amount and a per-unit-electric-power fuel consumption increase amount is described. In the present embodiment, a per-unit-electric-power fuel consumption decrease amount in the EV travel mode is the "EV effect", and a per-unit-electric-power fuel consumption increase amount in the engine generation mode is the "engine generated power cost".

First, an engine efficiency η eng and an MG-INV efficiency η ele that are respectively used for the calculation of the EV effect, and the engine generated power cost are described. The engine efficiency η eng is an efficiency of the engine 11 as a separate device (i.e., by itself or engine-only), and the MG-INV efficiency η ele is an efficiency of a combination of the motor generator 12 and the inverter 14. In the present embodiment, a combined efficiency including the efficiency of the inverter 14 is designated as a "motor generator efficiency".

Figure 3:
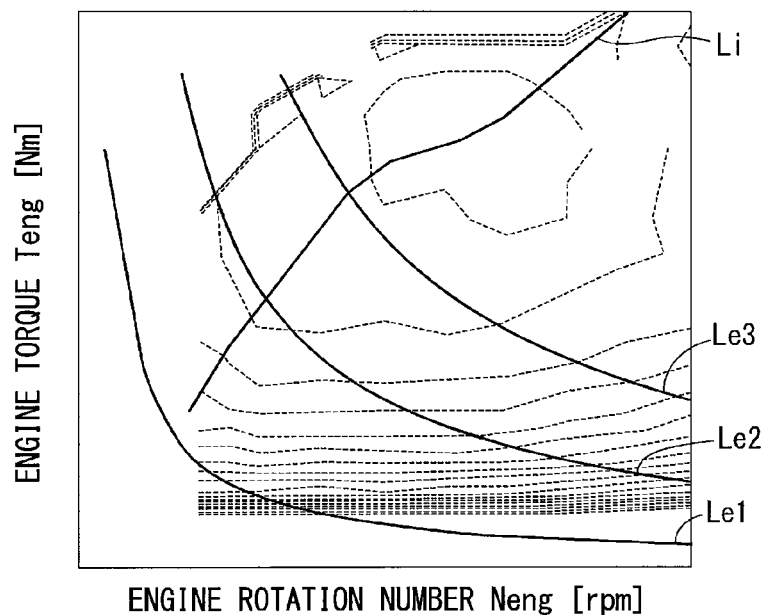
FIG. 3 is an illustration diagram of an ideal fuel consumption line of an engine in the first embodiment of the present disclosure.

FIG. 3 shows a contour line (i.e., a broken line) of a fuel consumption rate Ceng [g/h] in a diagram in which a horizontal axis is an engine rotation number Neng [rmp] and a vertical axis is an engine torque Teng [Nm]. Solid lines Le1, Le2, and Le3 are equi-power lines, which are connecting lines connecting equi-power points, i.e., points of the same engine power Peng. Further, a solid line Li is the ideal fuel consumption line which connects minimum fuel consumption points, i.e., the points on the equi-power lines where the fuel consumption rate Ceng falls to the minimum.

Figure 4:
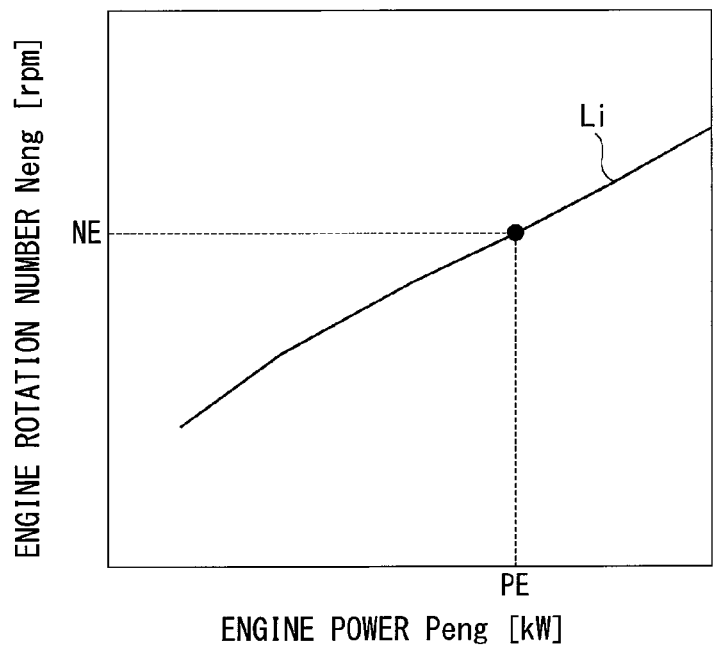
FIG. 4 is an illustration diagram of a relationship between an engine power and an engine rotation number on the ideal fuel consumption line of the engine in the first embodiment of the present disclosure.
Figure 5:
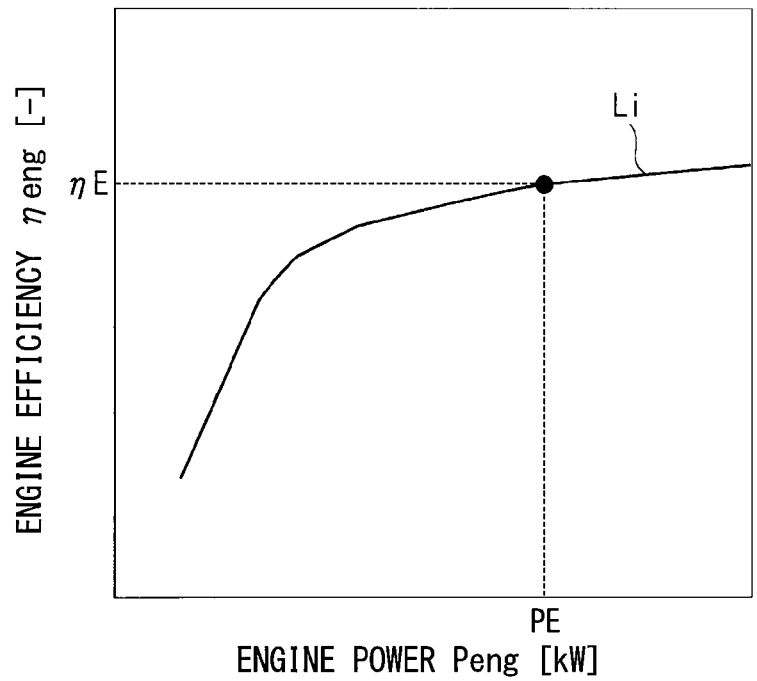
FIG. 5 is an illustration diagram of an engine efficiency on the ideal fuel consumption line of the engine in the first embodiment of the present disclosure.

FIG. 4 is a diagram of a relationship between the engine power Peng and the engine rotation number Neng based on the ideal fuel consumption line Li in FIG. 3. FIG. 5 is a diagram of a relationship between the engine power Peng and the engine efficiency η eng based on the ideal fuel consumption line Li in FIG. 3.

Since the engine 11 is controlled so that the operation points of the engine 11 are on the ideal fuel consumption line Li in the present embodiment, once the engine power Peng is determined, the operation point is determined as a single point as shown in FIG. 4, thereby leading to a determination of the engine rotation number Neng. Further, as shown in FIG. 5, when the engine power Peng is determined, the engine efficiency η eng is determined.

Figure 6:
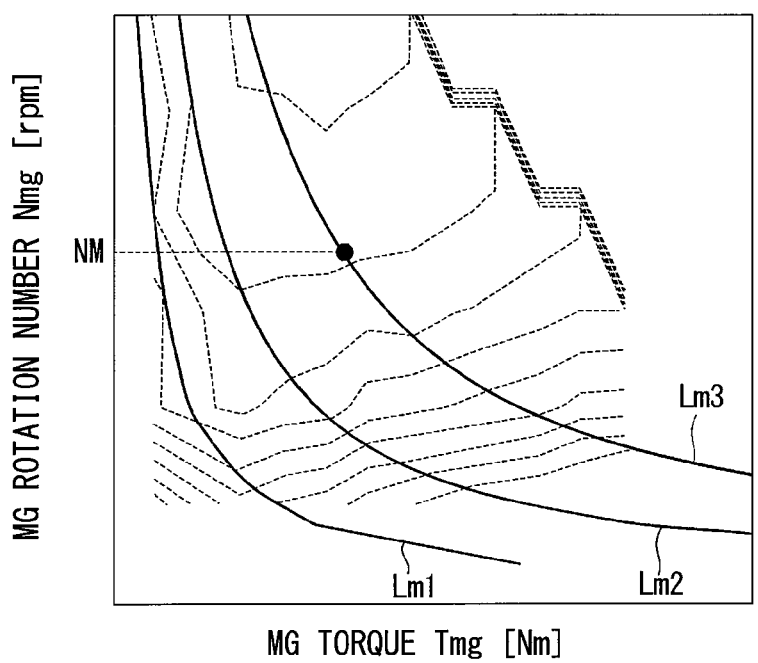
FIG. 6 is an illustration diagram of an MG-INV efficiency in the first embodiment of the present disclosure.

FIG. 6 shows a contour line (i.e., a broken line) of the MG-INV efficiency η ele [–] in a diagram in which a horizontal axis is an MG torque Tmg [Nm] and a vertical axis is an MG rotation number Nmg [rpm]. Solid lines Lm1, Lm2, and Lm3 are equi-power lines, which are connecting lines connecting equi-power points, i.e., points of the same MG power Pmg.

Further, since the operation point is determined as a single point when the MG rotation number Nmg and the MG power Pmg are determined, the MG-INV efficiency η ele is computable with reference to a map of FIG. 6.

More practically, when the engine power Peng is determined as PE as shown in FIG. 4, for example, the engine rotation number Neng is determined as NE. Further, as shown in FIG. 5, when the engine power Peng is determined as PE, the engine efficiency η eng is determined as η E.

Further, when the engine rotation number Neng is determined as NE, the MG rotation number Nmg is determined as a single/unique value, i.e., as NM. Then, when the MG power Pmg and the MG rotation number Nmg are determined as shown in FIG. 6, the MG-INV efficiency η ele is determined as η M.

That is, in other words, when the engine power Peng and the MG power Pmg are determined, the engine efficiency η eng and the MG-INV efficiency η ele are computable.

Since the engine 11 and the motor generator 12 are disconnected by the first clutch 16 at the time of the EV travel, there is no relationship between the engine rotation number Neng and the MG rotation number Nmg.

Therefore, in the EV travel mode, the computation of the MG-INV efficiency η ele may be performed based on an assumption that the motor generator 12 is driven at the optimal efficiency points, where the MG-INV efficiency η ele rises to the optimal point on the equi-power line. Further, based on an assumption that the motor generator 12 is driven at an operation point that takes the engine rotation number Neng into consideration, for appropriately shifting the engine 11 and the motor generator 12 to a clutch connected state by the connection of the first clutch 16, the MG-INV efficiency η ele may be computed based on such an operation point.

Figure 7:
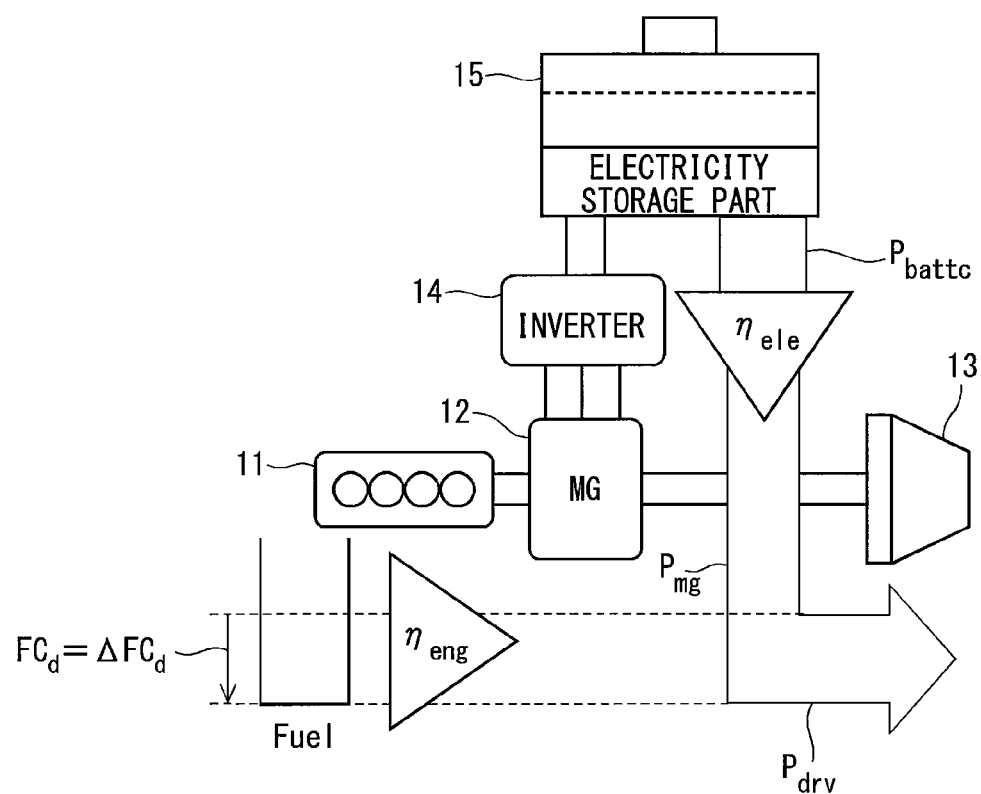
FIG. 7 is an illustration diagram of an EV effect in the first embodiment of the present disclosure.
Figure 8:
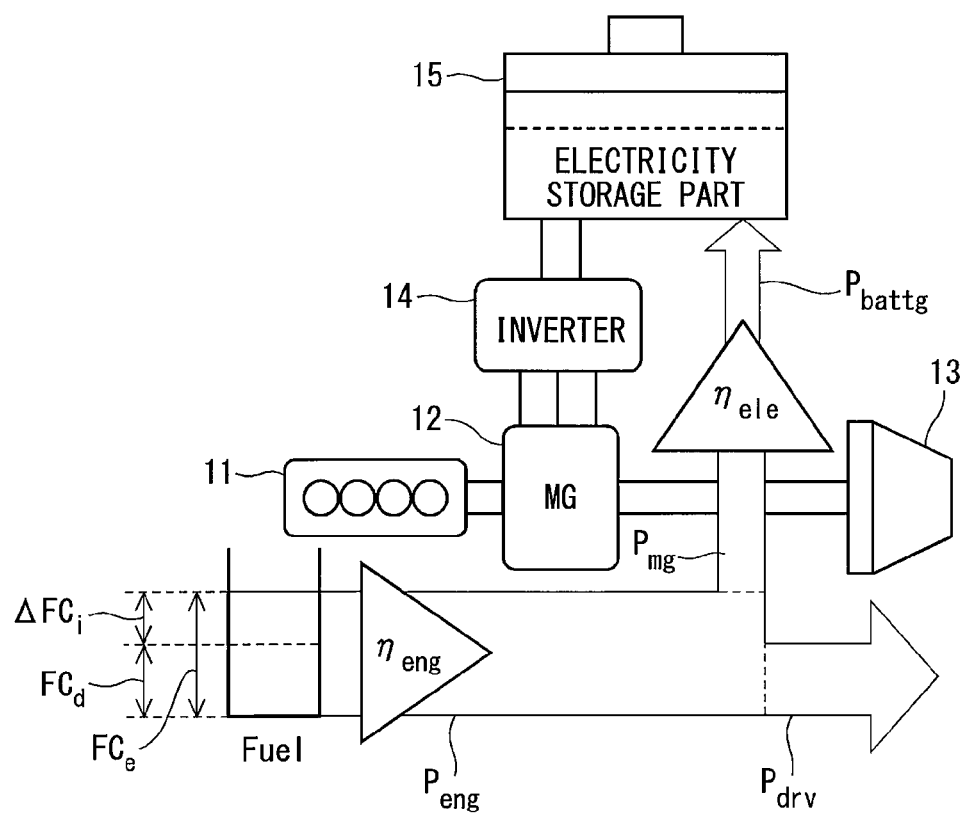
FIG. 8 is an illustration diagram of an engine generated power cost in the first embodiment of the present disclosure.

Then, the calculation methods of the EV effect and the engine generated power cost are described based on FIGS. 7 and 8. Hereafter, the per-unit-time fuel consumption decrease amount is designated as "ΔFCd", and the per-unit-time fuel consumption increase amount is designated as "ΔFCi".

FIG. 7 is a diagram for explaining the EV effect.

In the EV travel mode, the requested drive power Pdrv is provided as the MG power Pmg which comes from the motor generator 12 that is driven by the electric power of the electricity storage part 15. Therefore, the requested drive power Pdrv is represented by an Equation (1) based on a consumed electric power Pbattc [kW].

$$P_{drv}=P_{battc}\times\eta_{ele}(P_{drv}) \quad \text{Equation (1)}$$

The term "η ele (Pdrv)" in the above equation is the MG-INV efficiency at the time of outputting the requested drive power Pdrv as the MG power Pmg from the motor generator 12, and is calculated from the map shown in FIG. 6. Hereafter, the term "η ele (Px)" is considered as the MG-INV efficiency at the time of outputting a power Px as the MG power Pmg from the motor generator 12, and is considered as a value calculated from the map shown in FIG. 6.

Further, in the EV travel mode, a fuel consumption FCd in the case of providing the requested drive power Pdrv as the engine power Peng that is generated by the drive of the engine 11 is considered as the fuel consumption decrease amount ΔFCd. When the requested drive power Pdrv is provided as the engine power Peng generated by the drive of the engine 11, the requested drive power Pdrv is represented by a following Equation (2).

$$P_{drv}=\Delta FC_d\times\rho\times\eta_{eng}(P_{drv}) \quad \text{Equation (2)}$$

The term η eng (Pdrv) in the above equation is the engine efficiency at the time of outputting the requested drive power Pdrv as the engine power Peng from the engine 11, and is calculated from the map shown in FIG. 5. Hereafter, "η eng (Py)" is considered as the engine efficiency at the time of outputting the power Py as the engine power Peng from the engine 11, and is considered as a value calculated from the map shown in FIG. 5.

Further, the term ρ [kJ/g] in the above equation is a fuel energy density, and is a constant according to the kind of the fuel.

When the EV effect is defined by a following Equation (3), the EV effect is represented by a following Equation (4) based on the Equations (1) and (2). From the Equation (4), the EV effect is computed based on the engine efficiency η eng and the MG-INV efficiency η ele.

$$\text{EV effect[g/s/kW]} = \frac{\text{Per-unit-time fuel consumption decrease amount[g/s]}}{\text{Consumed elecctric power[kW]}}$$

$$= \frac{\Delta FC_d}{P_{battc}}$$

$$\frac{\Delta FC_d}{P_{battc}} = \frac{\eta_{ele}(P_{drv})}{\eta_{ele}(P_{drv})} \times \frac{1}{\rho} \qquad \text{Equation (4)}$$

FIG. 8 is a diagram illustrating the engine generated power cost.

In the engine generation mode, a part of the engine power Peng is used for the drive of the motor generator 12, and the electric power generated by the drive of the motor generator 12 is supplied to the electricity storage part 15 via the inverter 14, and the electric power is charged to the electricity storage part 15. A charge electric power Pbattg charged to the electricity storage part 15 is represented by a following Equation (5).

$$P_{battg} = P_{mg} \times \eta_{ele}(P_{mg}) \qquad \text{Equation (5)}$$

In the engine generation mode, a difference between (i) the fuel consumption FCd in the case of outputting the requested drive power Pdrv from the engine 11 and (ii) a fuel consumption FCe in the case of outputting the MG power Pmg in addition to outputting the requested drive power Pdrv from the engine 11 is the fuel consumption increase amount ΔFCi.

The fuel consumption increase amount ΔFCi is represented by a following Equation (6).

$$\Delta FC_i = -\frac{P_{drv}}{\eta_{eng}(P_{drv})} \times \frac{1}{\rho} + \frac{P_{drv} + P_{mg}}{\eta_{eng}(P_{drv} + P_{mg})} \times \frac{1}{\rho} \qquad \text{Equation (6)}$$

When the engine generated power cost is defined by a following Equation (7), the engine generated power cost is represented by a following Equation (8) based on the Equations (5) and (6). The engine generated power cost is computed by the following Equation (8) based on the engine efficiency η eng, the MG-INV efficiency η ele, the requested drive power Pdrv, and the MG power Pmg. The MG power Pmg provided for drive of the motor generator 12 to generate the electric power corresponds to an engine generated power Pgen to be described later.

$$\text{Engine generation cost[g/s/kW]} = \qquad \text{Equation (7)}$$

$$\frac{\text{Per unit time fuel consumption increase amt[g/s]}}{\text{Generated electric power [kW]}} = \frac{\Delta FC_i}{P_{battg}}$$

$$\frac{\Delta FC_i}{P_{battg}} = \qquad \text{Equation (8)}$$

$$\left\{ -\frac{P_{drv}}{\eta_{eng}(P_{drv})} + \frac{P_{drv} + P_{mg}}{\eta_{eng}(P_{drv} + P_{mg})} \right\} \times \frac{1}{P_{mg} \times \eta_{ele}(P_{mg}) \times \rho}$$

The Equations (4) and (8) are represented by the engine efficiency η eng and the MG-INV efficiency η ele which are computed based on the engine power.

That is, in other words, the EV effect and the engine generated power cost are computable based on the engine efficiency η eng and the MG-INV efficiency η ele.

Further, in the EV travel mode, a following Equation (9) is valid.

$$P_{drv} = P_{mg} \qquad \text{Equation (9)}$$

That is, in other words, the EV effect may be computed based on the requested drive power Pdrv or the MG power Pmg based on the Equation (4).

Further, a following Equation (10) is valid in the engine generation mode.

$$P_{drv} = P_{eng} - P_{mg} \qquad \text{Equation (10)}$$

One of the requested drive power Pdrv, the engine power Peng, and the MG power Pmg is convertible from the other two based on the Equation (10).

Further, with reference to the Equations (8), the engine generated power cost are computed based on at least two of the requested drive power Pdrv, the engine power Peng, and the MG power Pmg.

Figure 9:
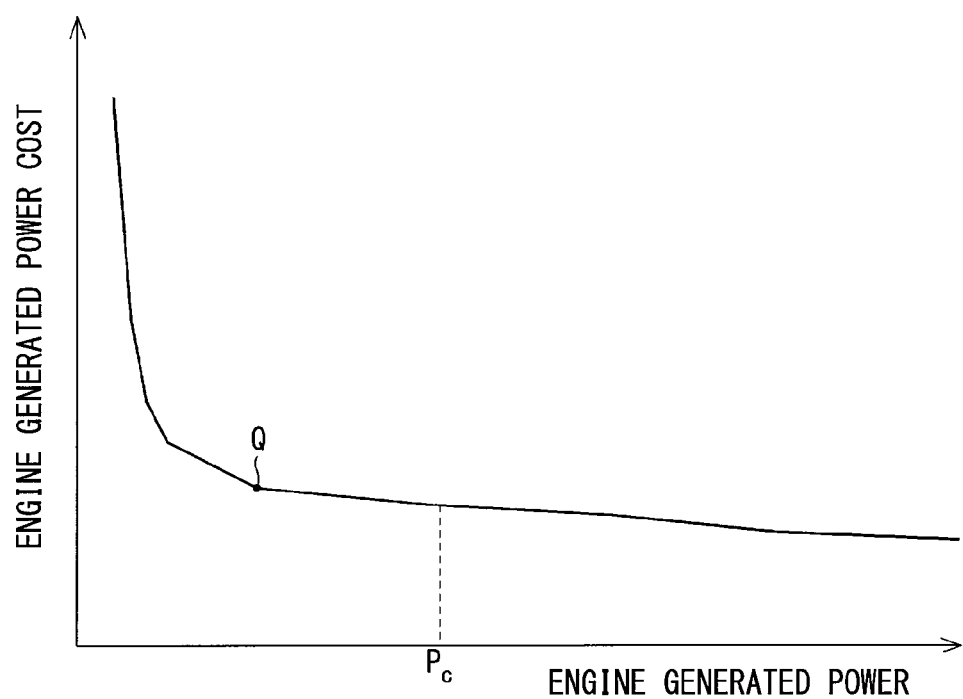
FIG. 9 is an illustration diagram of a relationship between the engine generated power cost and an engine generated electric power in the first embodiment of the present disclosure.

The relationship between the engine generated electric power Pgen and the engine generated power cost when the drive power is assumed as constant is shown in FIG. 9. When the drive power is set as constant, the smaller the engine generated electric power Pgen is, the higher the engine generated power cost is as shown in FIG. 9. Further, when the engine generated electric power Pgen becomes greater, the rate of change of the engine generated power cost becomes substantially constant. Therefore, according to the present embodiment, the engine generated power cost is calculated as a value when the engine generated electric power Pgen is a constant value Pc. The constant value Pc is chosen as a value that keeps the rate of change of the engine generated power cost versus the engine generated electric power Pgen under a predetermined small value. The predetermined small value of the rate of change of the engine generated power cost against the engine generated electric power Pgen may be a rate of change at an inflection point Q, for example.

Figure 10:
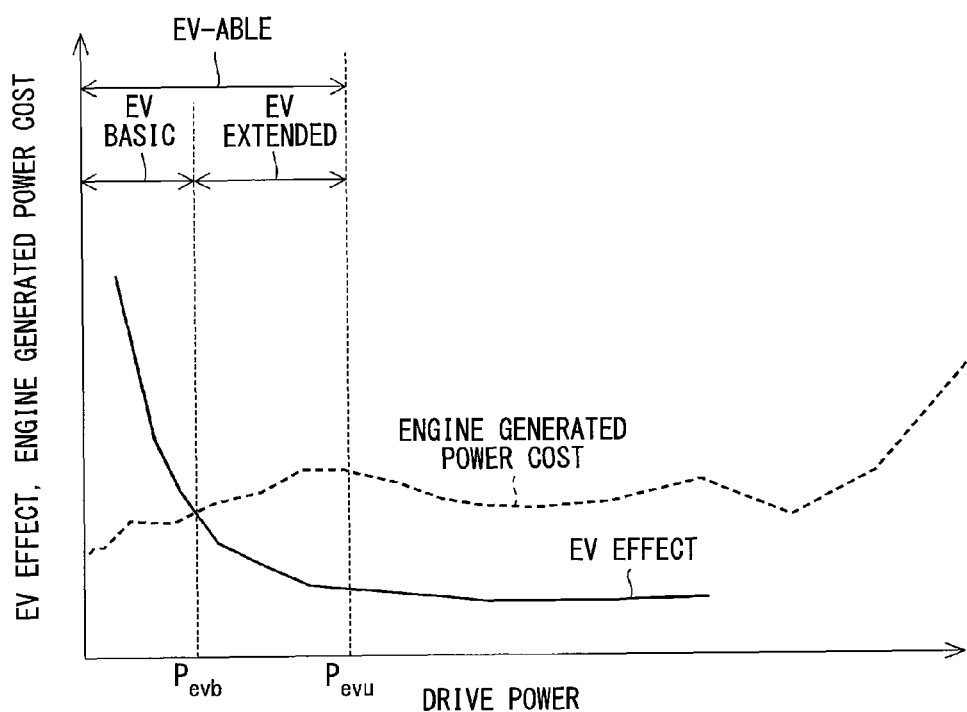
FIG. 10 is an illustration diagram of a relationship between the EV effect and the engine generated power cost in the first embodiment of the present disclosure.

The relationship among the drive power when the engine generated electric power Pgen is the constant Pc, the EV effect, and the engine generated power cost is shown in FIG. 10. According to the present embodiment, the EV effect and the engine generated power cost which are pre-calculated as mentioned above are stored as a map as shown in FIG. 10.

As shown in FIG. 10, a region up to an EV upper limit Pevu which is an upper limit output of the drive power from the motor generator 12 is designated as an "EV-able region".

The efficiency of the engine 11 is low when it outputs a low power. Therefore, when the drive power is smaller than Pevb, the EV effect is greater than the engine generated power cost. According to the present embodiment, when the drive power takes a certain value at which the engine generated power cost is equal to the EV effect, such a drive power is designated as an "EV basic threshold Pevb", and a less-than-threshold region of the drive power is designated as an "EV basic region". In the EV basic region, the EV travel mode is selected as a travel mode, because the EV effect is greater than the engine generated power cost. In the EV basic region, even when there is no surplus electric energy, which may make it necessary to subsequently generate the electric power by the drive of the engine, and the loss is incurred by such electric power generation and the consumed electric power (by the EV drive), the fuel consumption efficiency is improved by the travel of the vehicle in the EV travel mode.

On the other hand, when the drive power exceeds the EV basic threshold Pevb, the engine generated power cost is greater than the EV effect. A range of the drive power from (i.e., being equal to) the EV basic threshold Pevb to the EV upper limit Pevu is designated as an "EV extended region". In the EV extended region, the engine generated power cost is greater than the EV effect. Therefore, the travel of the vehicle in the EV travel mode will not be performed if the generation of the electric power by the drive of the engine is required. That is, the travel mode is selected depending on whether the surplus electric energy is available. In other words, in the EV extended region, when the surplus electric energy is available, the EV travel mode is selected. On the other hand, when no surplus electric energy is available, the EV travel of the vehicle, which may make it necessary to subsequently supplement the electric power consumed in the EV travel by the engine generation, deteriorates the fuel consumption efficiency. Therefore, in the EV extended region, when no surplus electric energy is available, either of the engine travel mode or the engine generation mode is selected.

The "surplus electric energy" is a difference between (i) the generated electric power mainly from the regeneration by braking and (ii) the consumed electric power. However, the "surplus electric energy" may include a surplus of the electric power generated by the engine 11 when, for example, the operation of the engine 11 is controlled/brought to an efficient operation point. Hereafter, the surplus electric energy is described as the generated electric power by a deceleration regeneration (i.e., henceforth designated as "a deceleration regeneration electric power Ereg").

Next, a travel mode selection process is explained based on flowcharts in FIGS. 11 to 14. This process is performed at a preset interval by the travel mode selection part 23.

Figure 11:
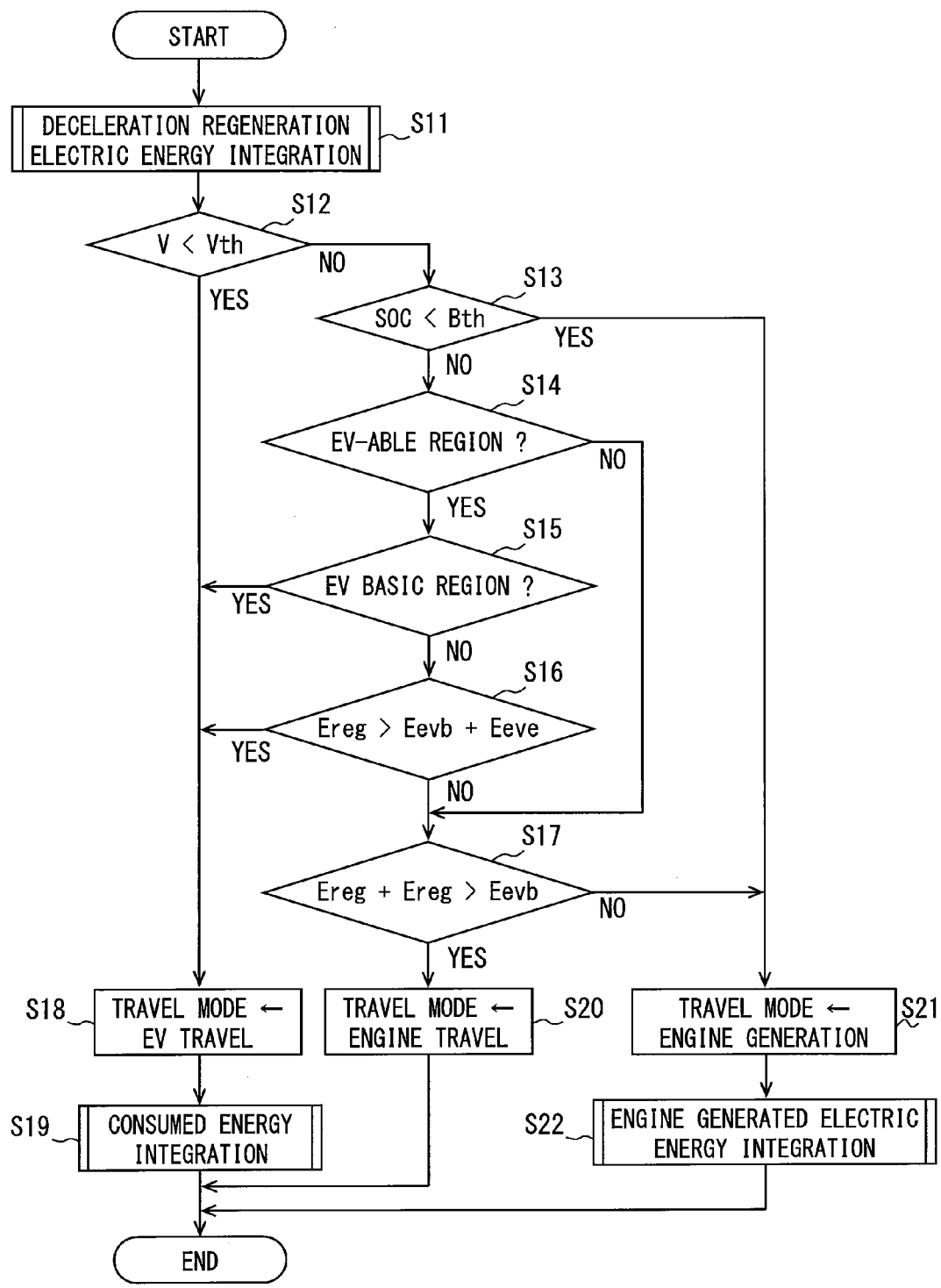
FIG. 11 is a flowchart of a travel mode selection process in the first embodiment of the present disclosure.

As shown in FIG. 11, in step S11 (i.e., "step" hereafter abbreviated to "S"), a deceleration regeneration electric energy integration is performed. A sub-routine for the deceleration regeneration electric energy integration is mentioned later based on FIG. 12.

In S12, it is determined whether a vehicle speed V is lower than an EV travel threshold speed Vth. When the vehicle speed V is determined to be lower than The EV travel threshold speed Vth (S12:YES), the process shifts to S18 and the travel mode is set to the EV travel mode. When the vehicle speed V is determined to be equal to or greater than the EV travel threshold speed Vth (S12:NO), the process shifts to S13.

In S13, it is determined whether a forced charge request exists. Such a determination is performed based on the information from the charge request calculation part 22. That is, it is determined that a forced charge request exists when a state of charge (SOC) is lower than a forced charge threshold Bth, and, it is determined that there is no forced charge request when a state of charge (SOC) is equal to or greater than the forced charge threshold Bth. When it is determined that a forced charge request exists (i.e., when the SOC is lower than the forced charge threshold Bth) (S13:YES), the process shifts to S21 and the travel mode is set to the engine generation mode. When it is determined that there is no forced charge request (i.e., when the SOC is equal to or greater than the forced charge threshold Bth) (S13:NO), the process shifts to S14.

In S14, it is determined whether the requested drive power Pdrv is in the EV-able region. According to the present embodiment, when the requested drive power Pdrv is smaller than the EV upper limit Pevu, it is determined that the requested drive power Pdrv is in the EV-able region. When it is determined that the requested drive power Pdrv is not in the EV-able region (S14:NO), i.e., when Pdrv≥Pevu, the process shifts to S17. When it is determined that the requested drive power Pdrv is in the EV-able region (S14:YES), i.e., when Pdrv<Pevu, the process shifts to S15.

In S15, it is determined whether the requested drive power Pdrv is in the EV basic region. In the present embodiment, a drive power range under the EV basic threshold Pevb at which the EV effect is equal to the engine generated power cost is designated/defined as the EV basic region (see FIG. 10). When it is determined that the requested drive power Pdrv is in the EV basic region (S15:YES), i.e., when Pdrv<Pevb, the process shifts to S18 and the travel mode is set to the EV travel mode. When it is determined that the requested drive power Pdrv is not in the EV basic region (S15:NO), i.e., when Pdrv≥Pevb, the process shifts to S16.

In S16, it is determined whether the deceleration regeneration electric power Ereg computed in S11 is greater than a sum of an EV basic energy consumption Eevb and an EV extended energy consumption Eeve which are computed in S19 in the last cycle of the present process. Step S16 is reached after a series of determinations, i.e., when Pdrv is in the EV-able region (S15:YES)+when Pdrv is in the EV basic region (S16:NO), step S16 is reached when Pdrv is in the EV extended region. Here, the process determines whether the surplus electric energy is available, and, it is determined that the surplus electric energy is available when the deceleration regeneration electric power Ereg is greater than the sum of the EV basic energy consumption Eevb and the EV extended energy consumption Eeve. When it is determined that the deceleration regeneration electric power Ereg is greater than the sum of the EV basic energy consumption Eevb and the EV extended energy consumption Eeve (i.e., when there is the surplus electric energy) (S16:YES), the process shifts to S18, and the travel mode is set to the EV travel mode. When it is determined that the deceleration regeneration electric power Ereg is equal to or smaller than the sum of the EV basic energy consumption Eevb and the EV extended energy consumption Eeve (i.e., when there is no surplus electric energy) (S16:NO), the process shifts to S17.

In S17, it is determined whether the sum of the deceleration regeneration electric power Ereg computed in S11 and an engine generated electric energy Egen computed in S22 in the last cycle of the present process is greater than the EV basic energy consumption Eevb. When it is determined that the sum of the deceleration regeneration electric power Ereg and the engine generated electric energy Egen is greater than the EV basic energy consumption Eevb (S17:YES), the process shifts to S20. When it is determined that the sum of the deceleration regeneration electric power Ereg and the engine generated electric energy Egen is equal to or smaller than the EV basic energy consumption Eevb (S17:NO), the process shifts to S21 and the travel mode is set to the engine generation mode, for supplementing the shortage of the EV basic energy consumption Eevb consumed in the EV basic region by the engine generated electric power.

When it is determined that the vehicle speed V is lower than the EV travel threshold speed Vth (S12:YES), when it is determined that the requested drive power Pdrv is in the EV basic region (S15:YES), or when it is determined that the deceleration regeneration electric power Ereg is greater than the sum of the EV basic energy consumption Eevb and the EV extended energy consumption Eeve (S16:YES), the process shifts to S18 and the travel mode is set to the EV travel mode.

In S19, a consumed energy integration is performed. A sub-routine for the consumed energy integration is mentioned later based on FIG. 14.

The travel mode is set to the engine travel mode in S20 which is reached when it is determined that the sum of the deceleration regeneration electric power Ereg and the engine generated electric energy Egen is greater than the EV basic energy consumption Eevb (S17:YES).

When it is determined that the forced charge request exists (S13:YES), or, when it is determined that the sum of the deceleration regeneration electric power Ereg and the engine generated electric energy Egen is equal to or smaller than the EV basic energy consumption Eevb (S17:NO), the process shifts to S21. In S21, the travel mode is set to the engine generation mode.

In S22, the engine generated electric energy integration is performed. A sub-routine for the engine generated electric energy integration is mentioned later based on FIG. 13.

Figure 12:
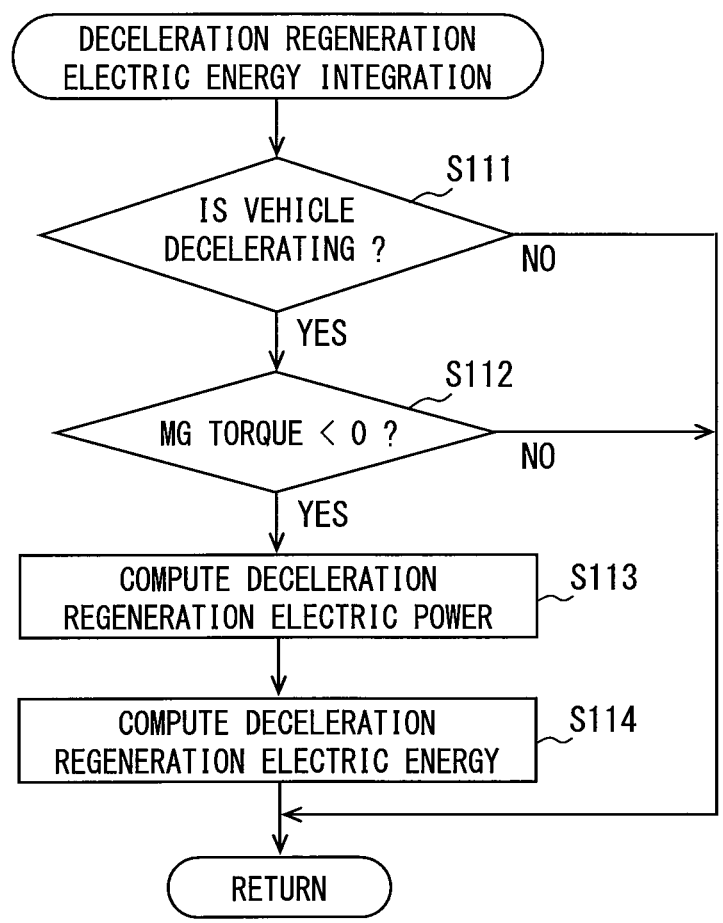
FIG. 12 is a flowchart of a deceleration regeneration electric energy integration sub-routine in the first embodiment of the present disclosure.

The sub-routine for the deceleration regeneration electric energy integration is shown in FIG. 12.

In S111, it is determined whether the vehicle is decelerating based on the vehicle speed information. The sub-routine is finished when it is determined that the vehicle is not decelerating (S111:NO). When it is determined that the vehicle is decelerating (S111:YES), the process shifts to S112.

In S112, it is determined whether the MG torque Tmg is smaller than zero. The sub-routine is finished when the MG torque Tmg is determined to be equal to or greater than zero (S112:NO). When it is determined that the MG torque Tmg is smaller than zero (S112:YES), the process shifts to S113.

In S113, a deceleration regeneration electric power Preg is computed according to a following Equation 11.

$$P_{reg}=T_{mg} \times N_{mg} \quad \text{Equation (11)}$$

In S114, by integrating the deceleration regeneration electric power Preg computed in S113, the deceleration regeneration electric power Ereg is computed, and the sub-routine is finished. The deceleration regeneration electric power Ereg is configured as an integration value of the deceleration regeneration electric power Preg for a past preset number of times.

Figure 13:
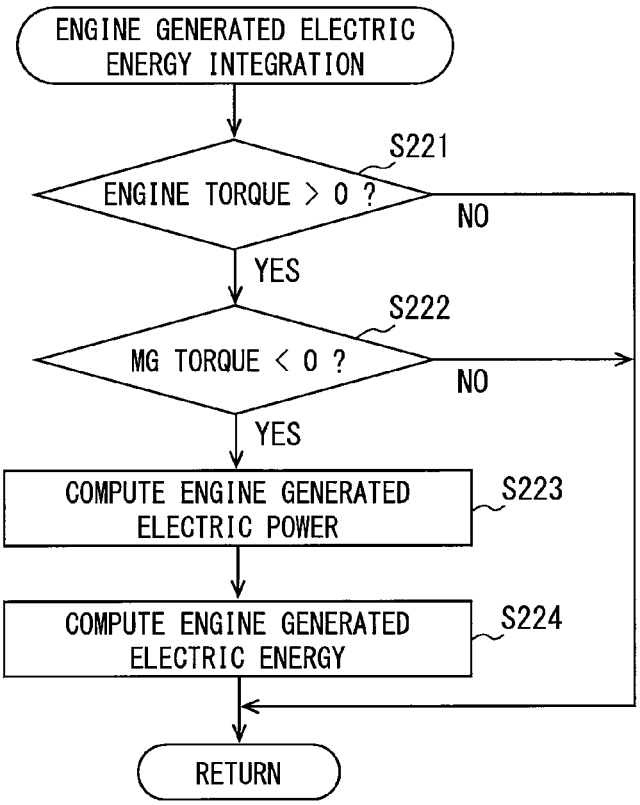
FIG. 13 is a flowchart of an engine generated electric energy integration sub-routine in the first embodiment of the present disclosure.

A sub-routine for the engine generated electric energy integration is shown in FIG. 13.

In S221, it is determined whether the engine torque Teng is greater than zero. The sub-routine is finished when it is determined that the engine torque Teng is smaller than zero (S221:NO).

When it is determined that the engine torque Teng is greater than zero (S221:YES), the process shifts to S222.

In S222, it is determined, just like S112 in FIG. 12, whether the MG torque Tmg is smaller than zero. The sub-routine is finished when it is determined that the MG torque Tmg is equal to or greater than zero (S222:NO). When it is determined that the MG torque Tmg is smaller than zero (S222:YES), the process shifts to S223.

An engine generated electric power Pgen is computed in S223 according to a following Equation 12.

$$P_{gen}=T_{mg} \times N_{mg} \quad \text{Equation (12)}$$

In S224, by integrating the engine generated electric power Pgen computed in S223, the engine generated electric energy Egen is computed and the sub-routine is finished. The engine generated electric energy Egen is configured as an integration value of the engine generated electric power Pgen for a past preset number of times.

Figure 14:
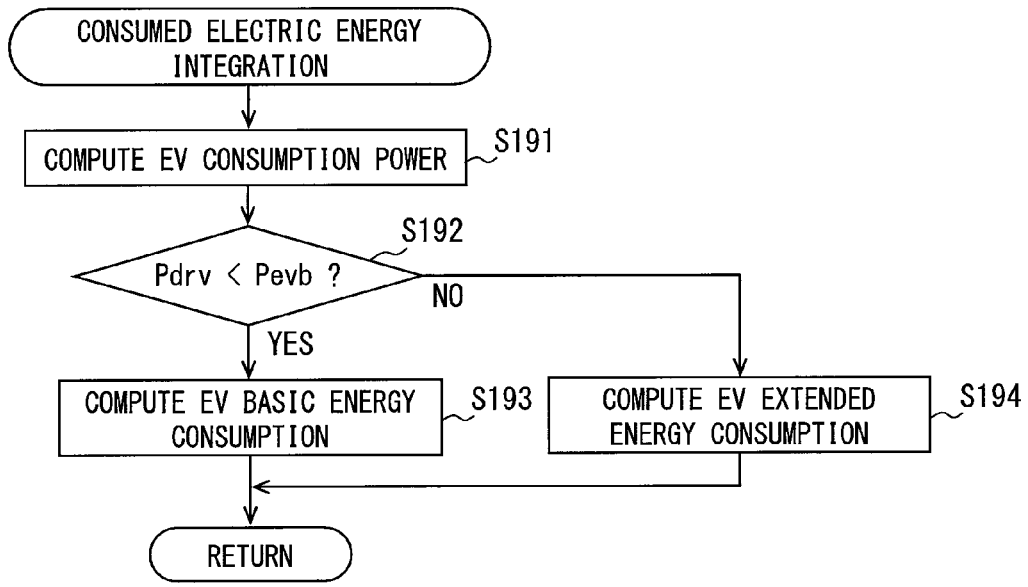
FIG. 14 is a flowchart of a consumed energy integration sub-routine in the first embodiment of the present disclosure.

A sub-routine for a consumed energy integration is shown in FIG. 14.

In S191, an EV consumption power Pev consumed in the EV travel is computed according to a following Equation 13.

$$P_{ev}=T_{mg} \times N_{mg} \quad \text{Equation (13)}$$

In S192, it is determined whether the requested drive power Pdrv is in the EV basic region, just like S15 of FIG. 11. When it is determined that the requested drive power Pdrv is in the EV basic region (S192:YES), that is, when Pdrv<Pevb, the process shifts to S193. When it is determined that the requested drive power Pdrv is not in the EV basic region (S192:NO), that is, when Pdrv≥Pevb, the process shifts to S194.

In S193, since the requested drive power Pdrv is in the EV basic region, the EV basic energy consumption Eevb consumed in the EV basic region is computed, and the sub-routine is finished. The EV basic energy consumption Eevb is configured as an integration value of the EV consumption power Pev at a time of selecting the EV travel mode in the EV basic region among a past preset number of times. In this case, the EV basic energy consumption Eevb is assumed to include a consumed energy that is consumed in a travel of the vehicle at the vehicle speed V that is under the EV travel threshold speed Vth. In this case, it is acceptable to allow the EV basic energy consumption Eevb to exceed the surplus electric energy, because the fuel consumption efficiency is still improved even when the shortage of the surplus electric energy for providing the EV basic energy consumption Eevb is supplemented later by the engine generated electric power.

In S194, the requested drive power Pdrv is in the EV extended region, and the EV extended energy consumption Eeve consumed in the EV extended region is computed, and the sub-routine is finished. The EV extended energy consumption Eeve is configured as an integration value of the EV consumption power Pev at a time of selecting the EV travel mode in the EV extended region among a past preset number of times. In this case, the EV extended energy consumption Eeve is preferably configured to be within an amount of the surplus electric energy, because the fuel consumption efficiency is deteriorated if the shortage of the surplus electric energy is supplemented later by the engine generated electric power.

Figure 15A:
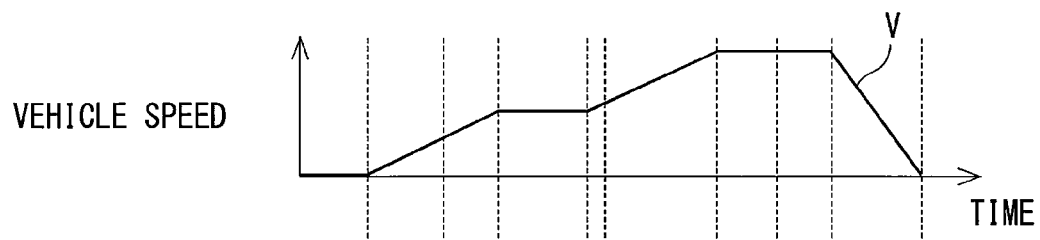
FIG. 15A is an illustration diagram of vehicle speed for a travel mode selection process for an electric energy surplus case in the first embodiment of the present disclosure.
Figure 15B:
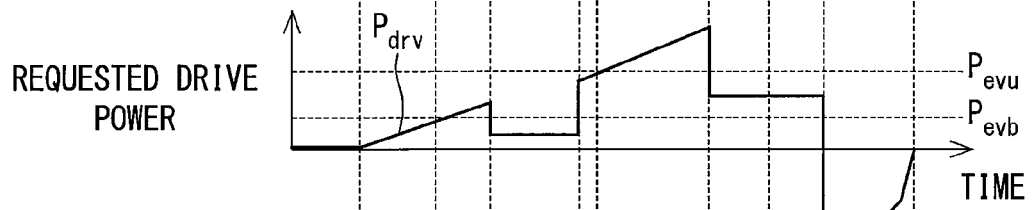
FIG. 15B is an illustration diagram of requested drive power for the travel mode selection process for the electric energy surplus case in the first embodiment of the present disclosure.

Here, an example of selection of a travel mode is described based on FIGS. 15A/B/C/D and 16A/B/C/D.

Figure 16A:
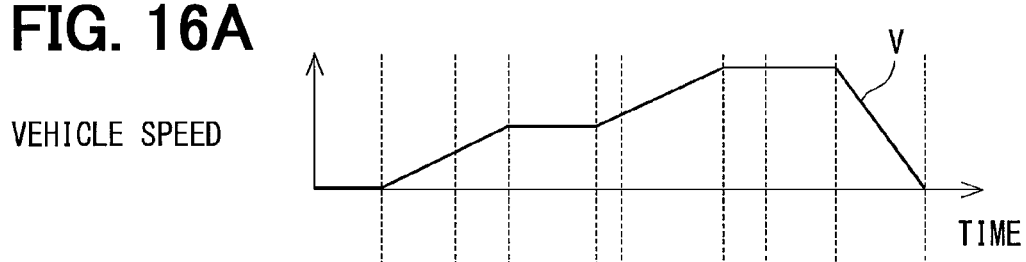
FIG. 16A is an illustration diagram of vehicle speed for a travel mode selection process for an electric energy shortage case in the first embodiment of the present disclosure.
Figure 16B:
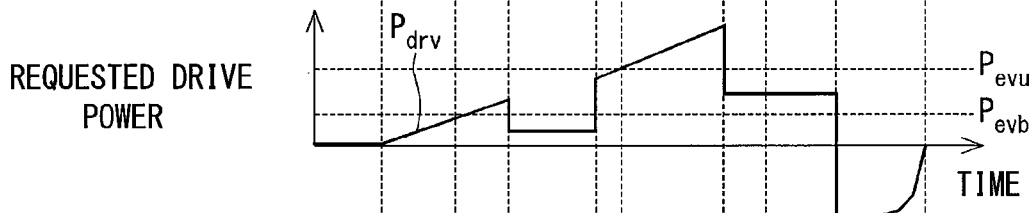
FIG. 16B is an illustration diagram of vehicle speed for the travel mode selection process for the electric energy shortage case in the first embodiment of the present disclosure.
Figure 16C:
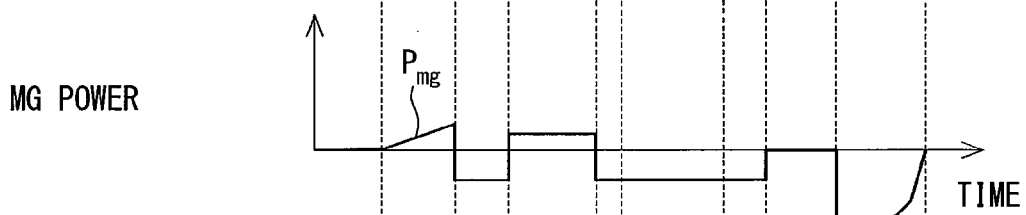
FIG. 16C is an illustration diagram of vehicle speed for the travel mode selection process for the electric energy shortage case in the first embodiment of the present disclosure.
Figure 16D:
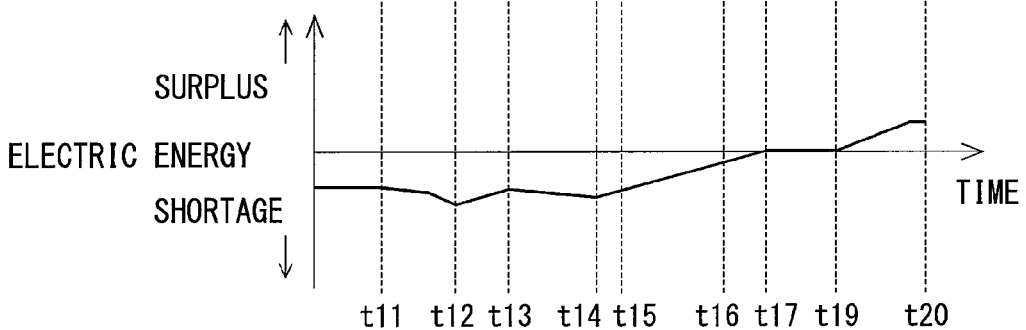
FIG. 16D is an illustration diagram of vehicle speed for the travel mode selection process for the electric energy shortage case in the first embodiment of the present disclosure.

FIGS. 15A/B/C/D show an example when having a surplus electric energy (S16:YES in FIG. 11), and FIGS. 16A/B/C/D show an example of electric energy shortage (S16:NO).

In FIGS. 15A/B/C/D and 16A/B/C/D, 15A/16A respectively show the vehicle speed V and 15B/16B respectively show the requested drive power Pdrv. In FIGS. 15A/B and 16A/B, the vehicle speed V and the requested drive power Pdrv transit/change similarly.

Figure 15C:
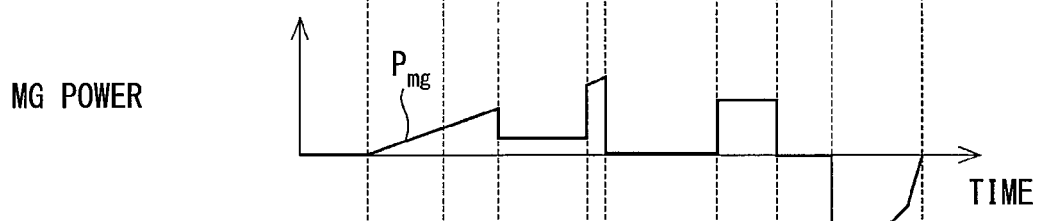
FIG. 15C is an illustration diagram of MG power for the travel mode selection process for the electric energy surplus case in the first embodiment of the present disclosure.
Figure 15D:
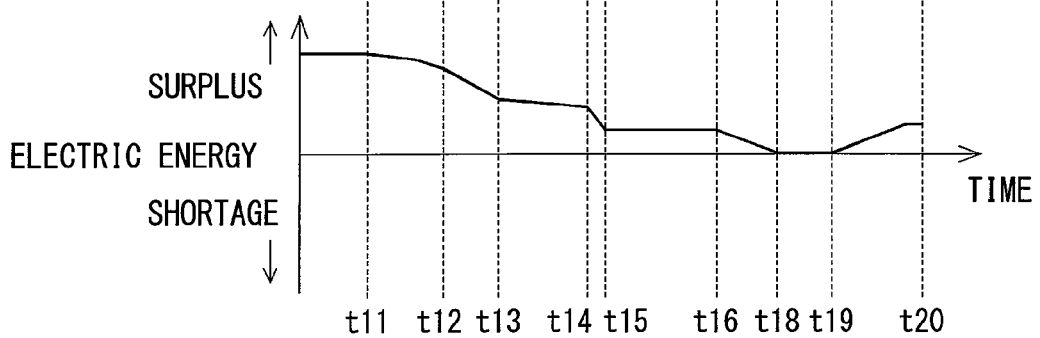
FIG. 15D is an illustration diagram of electric energy for the travel mode selection process for the electric energy surplus case in the first embodiment of the present disclosure.

FIGS. 15C/16C respectively show the MG power Pmg, and when the MG power Pmg takes a positive value, the motor generator 12 functions as a motor which outputs torque, and when the MG power Pmg takes a negative value, the motor generator 12 functions as a generator and the MG power Pmg at this time (i.e., "generator time") is the engine generated electric power Pgen. Further, FIGS. 15D/16D respectively show the electric energy, which indicates that when a graph is in a positive region, a surplus electric energy is available, and when a graph is in a negative region, the electric energy is in shortage.

First, an electric energy surplus case is described based on FIGS. 15A/B/C/D.

In a period from t11 to t13 when the vehicle speed V increases, the requested drive power Pdrv goes up with the increase of the vehicle speed V. More specifically, in a period from t11 to t12, since the requested drive power Pdrv is lower than the EV basic threshold Pevb and is in the EV basic region (S15:YES in FIG. 11), the travel mode is set to the EV travel mode (S18).

In a period from t12 to t13, since the requested drive power Pdrv is in the EV extended region (S14:YES and S15:NO), the electric energy is on a surplus side (S16:YES), the travel mode is set to the EV travel mode (S18).

In a period from t13 to t14, since the vehicle speed V is substantially constant and the requested drive power Pdrv is in the EV basic region (S15:YES), the travel mode is set to the EV travel mode (S18). In a period from t14 to t15 when the vehicle speed V starts to increase (S18), since the requested drive power Pdrv is in is the EV extended region (S14:YES and S15:NO) and the electric energy is on a surplus side (S16:YES), the travel mode is set to the EV travel mode.

In a period from t15 to t16 when the vehicle speed V further increases, since the requested drive power Pdrv exceeds the EV upper limit Pevu (S14:NO) and the electric energy is not on a shortage side (S17:YES), the travel mode is set to the engine travel mode.

In a period from t16 to t18 when the vehicle speed V is substantially constant, since the requested drive power Pdrv is in the EV extended region (S14:YES and S15:NO) and the electric energy is on a surplus side (S16:YES), the travel mode is set to the EV travel mode (S18). Here, at t18, the surplus electric energy becomes zero. That is, since there is no surplus or no shortage of the electric energy at such time (S16:NO, S17:YES), the travel mode is set to the engine travel mode in a period from t18 to t19 (S20).

In a period from t19 to t20 when the vehicle speed V decreases, the electric energy is accumulated by the deceleration regeneration.

Next, an electric energy shortage case is described based on FIGS. 16A/B/C/D.

In a period from t11 to t12, since the requested drive power Pdrv is in the EV basic region (S15:YES in FIG. 11), the travel mode is set to the EV travel mode, similarly to a case described with reference to FIGS. 15A/B/C/D.

Then, in a period from t12 to t13, since the requested drive power Pdrv is in the EV extended region (S14:YES and S15:NO) and the electric energy is on a shortage side (S16:NO), the travel mode is set to the engine generation mode (S21).

In a period from t13 to t14, since the requested drive power Pdrv is in the EV basic region (S15:YES), the travel mode is set to the EV travel mode (S18), just like FIG. 15 A/B/C/D.

Then, in a period from t14 to t15, since the requested drive power Pdrv is in the EV extended region (S14:YES and S15:NO) and the electric energy is on a shortage side (S16:NO), the travel mode is set to the engine generation mode (S21).

Further, in a period from t15 to t16, since the requested drive power Pdrv exceeds the EV upper limit Pevu (S14:NO) and the electric energy is on a shortage side (S17:NO), the travel mode continues to be set to the engine generation mode.

In a period from t16 to t17, since the requested drive power Pdrv is in the EV extended region (S14:YES and S15:NO) and the electric energy is on a shortage side (S16:NO), the travel mode is set to the engine generation mode (S21). Here, at t17, the electric energy becomes zero. That is, since there is no surplus or no shortage of the electric energy at such time (S16:NO, S17:YES), the travel mode is set to the engine travel mode (S20).

In a period from t19 to t20 when the vehicle speed V decreases, the electric energy is accumulated by the deceleration regeneration, just like FIGS. 15A/B/C/D.

As fully described in the above, the control section 20 of the present disclosure, which controls the vehicle 90 having the engine 11, the motor generator 12, and the electricity storage part 15 that provides and receives the electric power to and from the motor generator 12, is provided with the requested drive power calculation part 21 and the travel mode selection part 23.

The requested drive power calculation part 21 computes the requested drive power Pdrv based on the driver operation information and the vehicle speed information.

The travel mode selection part 23 selects one of the following modes as a travel mode of the vehicle 90, i.e., (i) the EV travel mode which outputs the requested drive power Pdrv from the motor generator 12, (ii) the engine generation mode which outputs the requested drive power Pdrv from the engine 11, or (iii) the engine generation mode which outputs the requested drive power Pdrv from the engine 11 and generates the electric power by driving the motor generator 12.

The travel mode selection part 23 selects the EV travel mode as the travel mode (S18), when (A) the EV effect (i.e., the fuel consumption decrease effect) derived from (i) the fuel consumption decrease amount $\Delta FCd$ at a time of outputting the requested drive power Pdrv from the motor generator 12 and (ii) the consumed electric power Pbattc is greater than (B) the engine generated power cost (i.e., the fuel increase consumption cost) derived from (i) the fuel consumption increase amount $\Delta FCi$ at a time of using the engine 11 for electricity generation by the drive of the motor generator 12 and (ii) and the charge electric power Pbattg (S15:YES in FIG. 11).

The travel mode selection part 23 selects the EV travel mode as the travel mode (S18), when the engine generated power cost is equal to or greater than the EV effect (S15:NO) and the surplus electric energy is available (S16:YES).

Also, the travel mode selection part 23 selects the engine travel mode or the engine generation mode as the travel mode (S20 or S21), when no surplus electric energy is available (S16:NO).

In the present embodiment, based on the comparison between the EV effect and the engine generated power cost, (i) when the EV effect is greater than the engine generated power cost, the EV travel mode is selected regardless of whether the surplus electric energy is available, because the travel of the hybrid vehicle by the drive power from the motor generator 12 yields a better (i.e., smaller) fuel consumption rate/amount, even when the engine 11 (and the power therefrom) is used later to drive the motor generator 12 for supplementing a shortage of the electric power.

Further, (ii) when the engine generated power cost is equal to or greater than the EV effect, (a) the EV travel mode is selected when the surplus electric energy is available from regeneration of the electric power or the like, or, (b) one of the engine travel mode or the engine generation mode is selected when the surplus electric energy is not available.

Thereby, since an appropriate travel mode is selected according to the travel state of the vehicle 90, the fuel consumption efficiency is improved. In addition, as compared with a case where a switch timing of the travel mode is set up in advance, the time and effort for fitting/adjusting the travel mode switch timing is saved.

The engine generated power cost used for the determination of a travel mode is calculated as a value based on the requested drive power Pdrv. Thereby, according to the requested drive power Pdrv, a travel mode can be selected appropriately.

Further, the engine generated power cost used for the determination of a travel mode is calculated as a value when the engine generated electric power Pgen used for the power generation by the motor generator 12 takes a constant value Pc. The constant value Pc is set as a value that keeps the rate of change of the engine generated power cost against the engine generated electric power Pgen below a predetermined small value. Thereby, the arithmetic operation for the calculation of the engine generated power cost used for the determination of a travel mode can be simplified. Further, when the engine generated power cost is calculated from the map shown in FIG. 10, only one map is used for the calculation. Therefore, in comparison to a case in which multiple maps are used for the same calculation, the amount of data for such calculation is reduced.

The travel mode selection part 23 selects the engine travel mode as the travel mode when (i) the engine generated power cost is equal to or greater than the EV effect according to the requested drive power Pdrv and (ii) there is no surplus and no shortage of electric energy, and selects the engine generation mode as the travel mode when (i) the engine generated power cost is equal to or greater than the EV effect according to the requested drive power Pdrv and (ii) a shortage of electric energy exists.

Thereby, since a travel mode is selected according to the state of the electric energy, the electricity storage part 15 is charged appropriately.

The fuel consumption decrease amount ΔFCd used for the calculation of the EV effect is computed based on the engine efficiency η eng, assuming that the fuel consumption FCd is consumed for outputting the requested drive power Pdrv from the engine 11. Further, the consumed electric power Pbattc used for the calculation of the EV effect is computed based on the requested drive power Pdrv and the MG-INV efficiency η ele.

Thereby, if the engine efficiency η eng and the MG-INV efficiency η ele are known, as compared with a case in which an actual vehicle is used for the measurement, the EV effect is appropriately computed with a simpler configuration.

The fuel consumption increase amount ΔFCi used for the calculation of the engine generated power cost is computed, based on the engine efficiency η eng, as a difference between (i) the fuel consumption FCd for outputting the requested drive power Pdrv from the engine 11 and (ii) the fuel consumption FCe for outputting (ii-a) the engine generated electric power Pgen that is used in a generation of the electric power in the motor generator 12 and (ii-b) the requested drive power Pdrv both from the engine 11. Further, the charge electric power Pbattg used for the calculation of the engine generated power cost is computed based on the engine generated electric power Pgen and the MG-INV efficiency η ele.

Thereby, if engine efficiency η eng and the MG-INV efficiency η ele are known, as compared with a case in which an actual vehicle is used for the measurement, the engine generated power cost is appropriately computed with a simpler configuration.

The engine efficiency η eng and the engine rotation number Neng are computed based on the output of the engine 11 and the ideal fuel efficiency information of the engine 11.

Further, the MG-INV efficiency η ele is computed based on the MG rotation number Nmg and the output of the motor generator 12.

Thereby, based on the power, the engine efficiency η eng and MG-INV efficiency η ele are computed appropriately.

The vehicle 90 has the transmission 13 which changes speed and transmits the driving force of the engine 11 and the motor generator 12 to the drive wheel 95. Further, the rotation number Neng of the engine 11 and the rotation number Nmg of the motor generator 12 are set to have a predetermined ratio. Thereby, the MG rotation number Nmg in the engine generation mode and in the MG assist mode is appropriately calculated from the engine rotation number Neng.

More specifically, since the transmission 13 of the present embodiment is a continuously variable transmission, the operating point of the engine 11 is freely controlled to fall on the ideal fuel consumption line, thereby enabling the improvement of the fuel consumption efficiency.

According to the present embodiment, the requested drive power calculation part 21 corresponds to a "requested drive power calculation unit", and the travel mode selection part 23 corresponds to a "travel mode selection unit". Further, a step S18 in FIG. 11, S20, and S21 corresponds to a process providing a function of a "travel mode selection unit".

(Second Embodiment)

Since the EV basic region and the EV extended region in the second embodiment differ from the above-mentioned embodiment, the vehicle control apparatus is described in the following with a focus on such difference based on FIG. 17.

Figure 17:
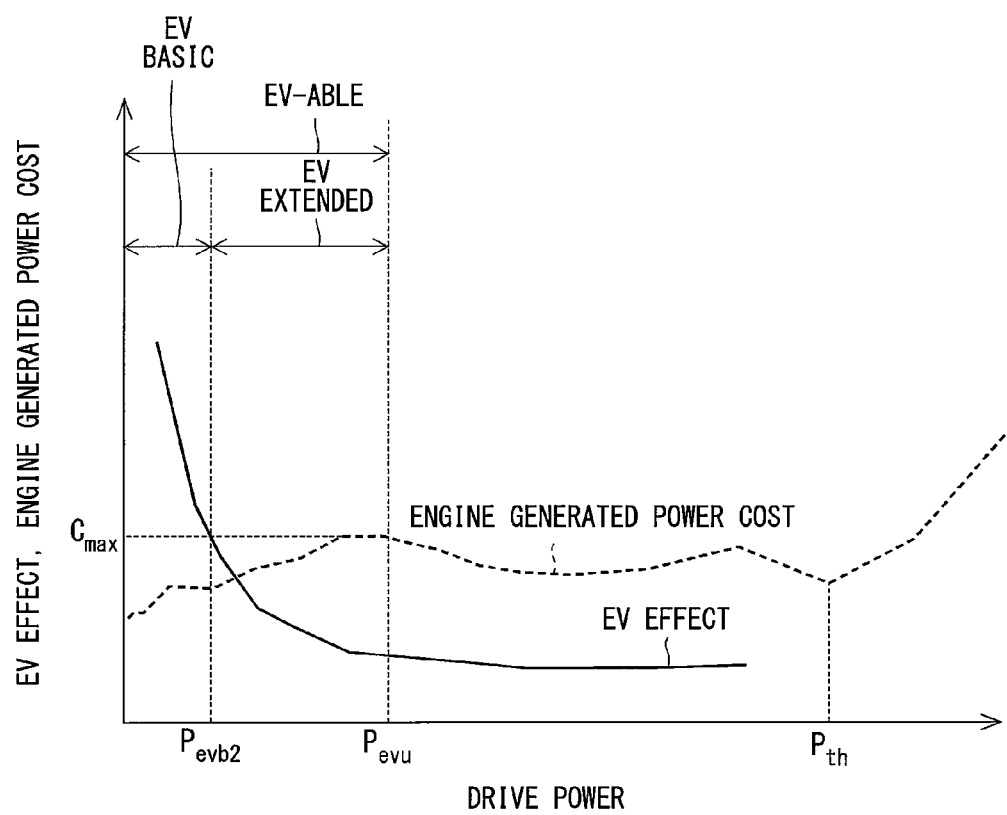
FIG. 17 is an illustration diagram of a relationship between the EV effect and the engine generated power cost in a second embodiment of the present disclosure.
Figure 18:
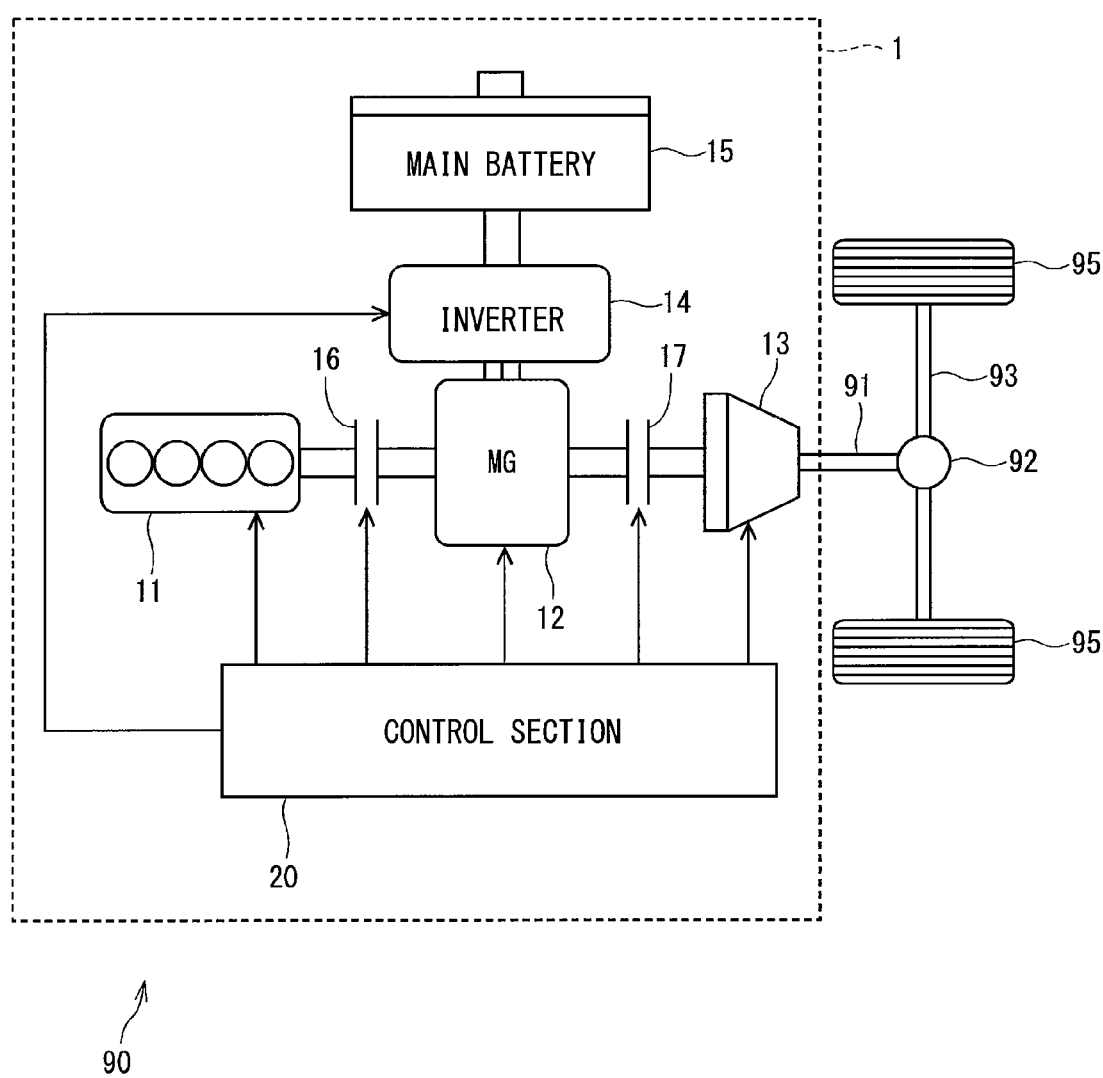
FIG. 18 is a block diagram of a vehicle control system in a third embodiment of the present disclosure.

FIG. 17 is an illustration diagram of a relationship between the EV effect and the engine generated power cost, which corresponds to FIG. 10 in the first embodiment.

According to the first embodiment, the EV effect according to the requested drive power Pdrv is compared with the engine generated power cost according to the requested drive power Pdrv, and where the EV effect is greater than the engine generated power cost is defined as the EV basic region.

In a sense, the electric power consumed for the EV travel in the EV basic region may be later supplemented by an "engine generation travel" in which the engine is used for both of the travel of the vehicle and the electric power generation. In view of such supplement scheme, the requested drive power Pdrv in the engine generation mode does not necessarily match the requested drive power Pdrv in the EV travel mode.

Therefore, according to the present embodiment, as shown in FIG. 17, the engine generated power cost used for the determination of a travel mode is set to a value Cmax, which is a maximum cost value for a preset range of the drive power. The preset range of the drive power may be set as a range equal to or smaller than a predetermined upper limit value Pth (e.g., 30 kW). The predetermined upper limit value Pth may be, for example, set as an upper limit value of a high efficiency engine operation region, i.e., a value corresponding to the maximum output of the engine 11 in the engine generation mode, which makes the engine efficiency η eng drop as soon as the output of the engine 11 exceeds the requested drive power Pdrv.

According to the present embodiment, the drive power that controls the EV effect to have the maximum value Cmax is designated as an EV basic threshold Pevb2, and "the EV basic region" is defined as a region where the drive power is lower than the EV basic threshold Pevb2. That is, the EV basic region of the present embodiment is a region in which the EV effect is securely greater than the engine generated power cost regardless of the requested drive power Pdrv for performing the engine power generation, thereby enabling the fuel efficiency improvement even when the EV travel is performed and the electric power used for the EV travel is supplemented by the generation of the electric power using the engine. Therefore, in the EV basic region, regardless whether the surplus electric energy is available, the travel mode is set to the EV travel mode.

Further, the "EV extended region" is defined as a region in which the drive power is equal to or greater than the EV basic threshold Pevb2 and is smaller than the EV upper limit Pevu. In the EV extended region, depending on the requested drive power Pdrv for performing the engine power generation, the engine generated power cost may become greater than the EV effect. Therefore, when the surplus electric energy is available, the travel mode is set to the EV travel mode, and, when no surplus electric energy is available, the travel mode is set to the engine travel mode or to the engine generation mode.

According to the present embodiment, the engine generated power cost used for the determination of a travel mode is configured to be the maximum value for a preset range of the requested drive power Pdrv. Then, (A) when the EV effect is greater than the engine generated power cost regardless of the requested drive power Pdrv in the engine generation mode (i.e., at the time of performing both of the engine travel and the generation of the electric power using the engine), the travel mode is set to the EV travel mode, and (B) when the engine generated power cost may become greater than the EV effect depending on the requested drive power Pdrv in the engine generation mode, the travel mode is selected according to the surplus electric energy. Thereby, regardless of the requested drive power Pdrv in the engine generation mode, the shortage of the electric energy due to the EV travel is supplemented by the generation of the electricity by the drive of the engine, which prevents the deterioration of the fuel consumption efficiency.

Further, the same effects as the above-mentioned embodiment are also achieved.

(Third Embodiment)

The vehicle control apparatus in the first embodiment of the present disclosure is described based on FIGS. 18-28.

As shown in FIG. 17, a vehicle control system 1 is provided with an engine (ENG) 11, a motor generator (MG) 12, a transmission 13, an inverter (INV) 14, a main battery 15 as an electricity storage part, a first clutch 16, a second clutch 17, and a control section 20 as a vehicle control apparatus, together with other parts.

The engine 11 and the motor generator 12 constitute a drive power source of a vehicle 90 which is a hybrid vehicle. The engine 11 is an internal-combustion engine having two or more cylinders, and a drive power of the engine 11 is transmitted to the motor generator 12 via the first clutch 16.

The motor generator 12 serves as an electric motor for generating a torque by receiving an electric power from the main battery 15 and by rotating, and also serves as a generator for generating electric power by receiving an engine torque from the engine 11 or by receiving a regenerative energy from braking of the vehicle 90.

An engine rotation number Neng which is a number of rotations of the engine 11, and an MG rotation number Nmg which is a number of rotations of the motor generator 12 are set to have a preset ratio. In the present embodiment, the ratio of the MG rotation number Nmg against the engine rotation number Neng is 1. That is, in the present embodiment, the engine rotation number Neng and the MG rotation number Nmg are equal.

The drive power of the engine 11 and the motor generator 12 is transmitted to a drive shaft 91 via the second clutch 17 and the transmission 13. The drive power transmitted to the drive shaft 91 rotates a drive wheel 95 via a gear 92 and an axle 93. The transmission 13 of the present embodiment is a continuously variable transmission (CVT) which can continuously change speed, i.e., without going through a stepwise gear change.

The inverter 14 is disposed at a position between the motor generator 12 and the main battery 15, and converts the electric power of the main battery 15 into an AC electric power, and supplies it to the motor generator 12. Further, the inverter 14 converts the electric power generated by the motor generator 12 into a DC electric power, and supplies it to the main battery 15. The main battery 15 is a rechargeable secondary battery, such as a nickel hydride battery or a lithium ion battery, for example, and is set to be chargeable and dischargeable. The main battery 15 is charged and discharged with its state of charge (SOC) maintained within a predetermined range.

The first clutch 16 is disposed at a position between the engine 11 and the motor generator 12, and is set to connect and disconnect a connection between the engine 11 and the motor generator 12. The first clutch 16 is controlled by the control section 20 to disconnect the engine 11 and the motor generator 12 when a travel mode is in an EV travel mode which is mentioned later.

The second clutch 17 is disposed at a position between the motor generator 12 and the transmission 13, and is set to connect and disconnect the motor generator 12 and the transmission 13.

The control section 20 is a microcomputer or the like, and is provided with a CPU, ROM, RAM, I/O and a bus line for connecting those parts which are not illustrated. The control section 20 controls, through a software process by executing a program that is pre-memorized in the CPU and/or a hardware process by a dedicated electronic circuit, an entire vehicle 90 which is based on a control of the engine 11, the motor generator 12, the transmission 13, the inverter 14, the first clutch 16, and the second clutch 17 and the like.

Figure 19:
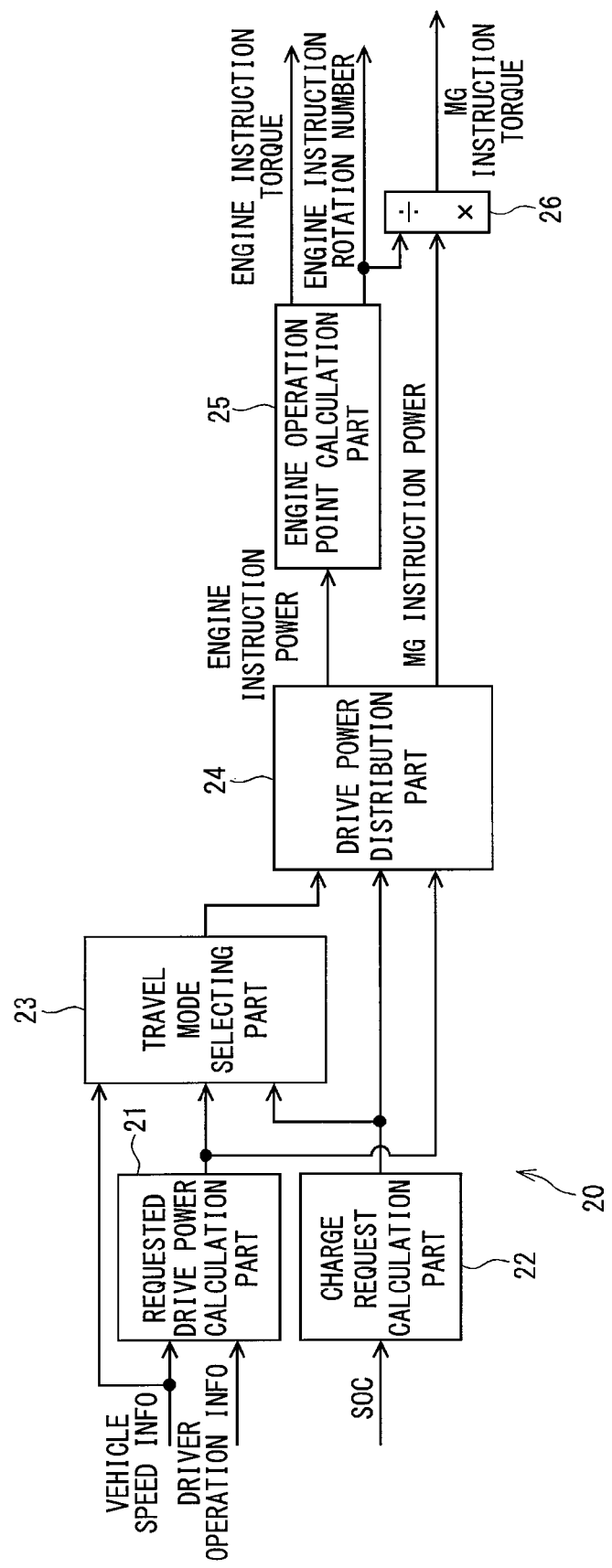
FIG. 19 is a block diagram of a vehicle control apparatus in the third embodiment of the present disclosure.

As shown in FIG. 19, the control section 20 has a requested drive power calculation part 21, a charge request calculation part 22, a travel mode selecting part 23, a drive power distribution part 24, an engine operation point calculation part 25, and an MG instruction torque calculation part 26 and the like.

The requested drive power calculation part 21 obtains driver operation information, including an accelerator opening etc. and vehicle speed information about a travel speed of the vehicle 90, and computes a requested drive power Pdrv. The requested drive power Pdrv is a power outputted to the drive shaft 91.

The charge request calculation part 22 computes whether a charge request exists based on an SOC of the main battery 15.

The travel mode selecting part 23 selects a travel mode. The travel mode may include: (i) an "engine travel mode" in which the vehicle travels by an engine power Peng which is a drive power outputted by the drive of the engine 11, (ii) an "EV travel mode" in which the vehicle travels by an MG power Pmg which is the drive power outputted by the drive of the motor generator 12, (iii) an "MG assist mode" in which the vehicle travels by the engine power Peng and the MG power Pmg, and (iv) an "engine generation mode" in which the vehicle travels by the engine power Peng and performs an electric power generation by the motor generator 12. In the present embodiment, the travel mode of the vehicle is arbitrarily switchable by controlling the drive of the engine 11, the drive of the motor generator 12, and the connection/disconnection of the first clutch 16.

According to the present embodiment, the travel mode is selected based on the vehicle speed information, the requested drive power Pdrv, whether the charge request has been placed, and a per-unit-electric-power fuel consumption reduction.

The details of selection of the travel mode and a calculation method of the per-unit-electric-power fuel consumption reduction are mentioned later.

In the drive power distribution part 24, an engine instruction power and an MG instruction power are computed based on the requested drive power Pdrv and the existence of a charge request according to the travel mode. In the EV travel mode, the requested drive power Pdrv is entirely distributed to and used as the MG instruction power. In the engine travel mode, the requested drive power Pdrv is entirely distributed to and used as the engine instruction power.

In the engine operation point calculation part 25, an operation point (i.e., a number of rotation, a torque) of the engine 11 is computed based on the engine instruction power. Since the transmission 13 of the present embodiment is a continuously variable transmission and a gear ratio of such mechanism can be freely and continuously set in a preset range, setting of the operation point of the engine 11 has a high degree of freedom. Therefore, in the present embodiment, the operation point of the engine 11 is controlled to fall on an ideal fuel consumption line by an adjustment of the engine power. That is, based on the engine instruction power, an engine instruction torque and an engine instruction rotation number are computed to have the operation point of the engine 11 on the ideal fuel consumption line. According to the present embodiment, an ideal fuel consumption line corresponds to "ideal fuel consumption information".

In the MG instruction torque calculation part 26, an MG instruction torque is computed based on the MG instruction power. Since the engine rotation number Neng is equal to the MG rotation number Nmg in the MG assist mode, an MG instruction rotation number is computed based on the engine instruction rotation number, and an MG instruction torque is computed based on the MG instruction rotation number and the MG instruction power.

Since the first clutch 16 separates the engine 11 and the motor generator 12 in the EV travel mode, the relationship between the engine rotation number Neng and the MG rotation number Nmg is lost. Therefore, for example, in outputting the MG power Pmg, the MG instruction torque is computed based on an operation point that maximizes an MG-INV efficiency ele, which is mentioned later. Further, the MG instruction torque may be so computed that the engine 11 and the motor generator 12 can shift appropriately to a clutch connected state in which the first clutch 16 connects the engine 11 and the motor generator 12.

Figure 20:
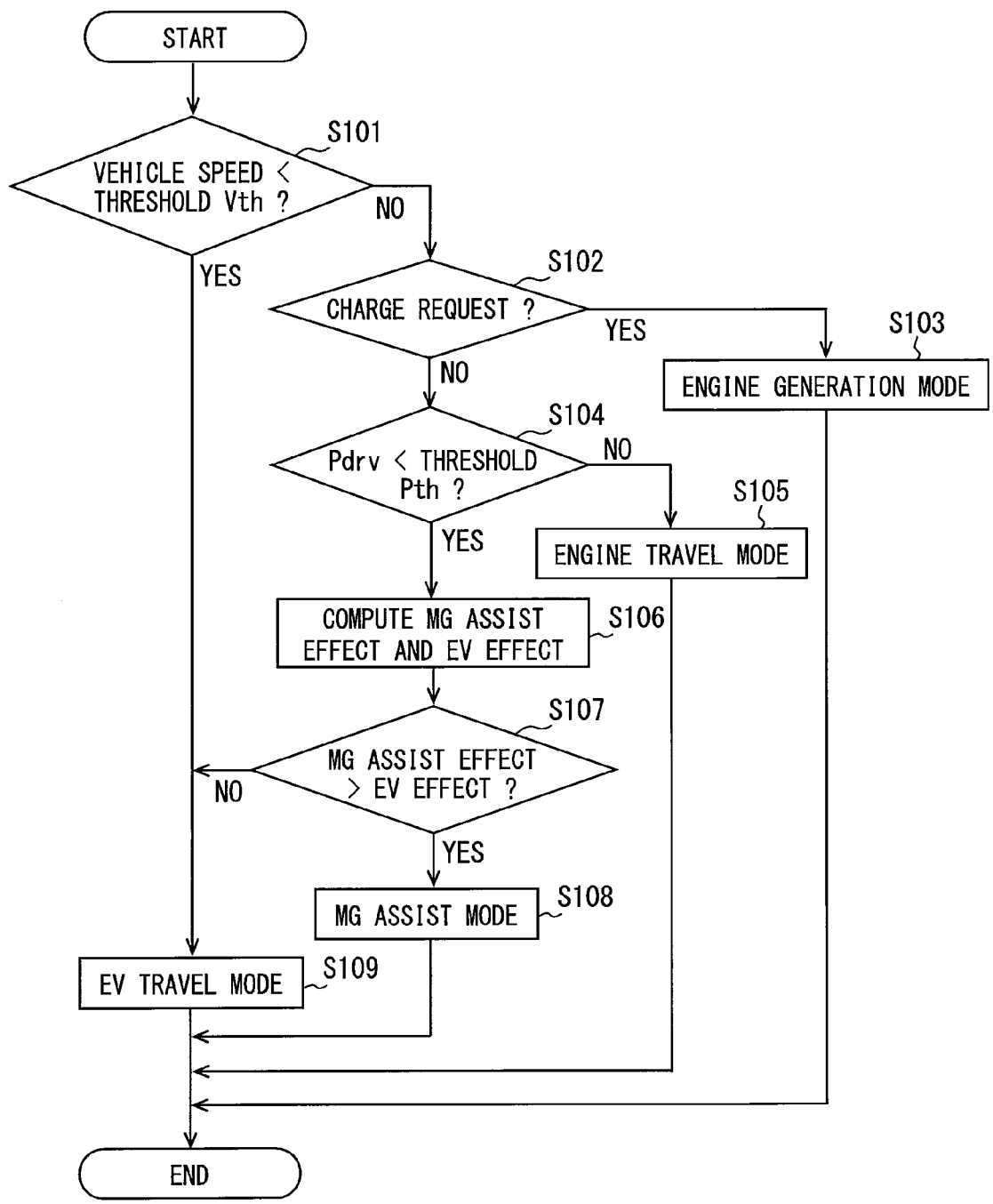
FIG. 20 is a flowchart of a travel mode selection process of a third embodiment of the present disclosure.

Here, a travel mode selection process by the travel mode selecting part 23 is described based on the flowchart shown in FIG. 20.

In the first step S101 (hereafter, a "step" is omitted and a sign "S" is used), it is determined whether a vehicle speed is smaller than an EV travel speed threshold Vth. When it is determined that the vehicle speed is smaller than the EV travel speed threshold Vth (S101:YES), the process shifts to S109. When the vehicle speed is determined to be equal to or greater than the EV travel speed threshold Vth (S101:NO), the process shifts to S102.

In S102, it is determined whether a charge request exists. When it is determined that there is no charge request (S102:NO), the process shifts to S104. When it is determined that a charge request exists (S102:YES), the process shifts to S103.

In S103, the travel mode is set to the engine generation mode.

In S104 which follows a no charge request determination (S102:YES), it is determined whether the requested drive power Pdrv is smaller than an engine travel drive power threshold Pth. When it is determined that the requested drive power Pdrv is smaller than the engine travel drive power threshold Pth (S104:YES), the process shifts to S106. When it is determined that the requested drive power Pdrv is equal to or greater than the engine travel drive power threshold Pth (S104:NO), the process shifts to S105.

In S105, the travel mode is set to the engine travel mode.

In S106 which follows a determination that the requested drive power Pdrv is smaller than the engine travel drive power threshold Pth (S104:YES), an MG assist effect and an EV effect are computed. Calculation of the MG assist effect and the EV effect is mentioned later.

In S107, it is determined whether the MG assist effect is greater than the EV effect. When it is determined that the MG assist effect is equal to or smaller than the EV effect (S107:NO), the process shifts to S109. When it is determined that the MG assist effect is greater than the EV effect (S107:YES), the process shifts to S108.

In S108, the travel mode is set to the MG assist mode.

In S109, which follows a determination that the vehicle speed is smaller than the EV travel speed threshold Vth (S101:YES) or a determination that the MG assist effect is equal to or smaller than the EV effect (S107:NO), the travel mode is set to the EV travel mode.

Next, a calculation method of a per-unit-electric-power fuel consumption decrease and a per-unit-electric-power fuel consumption increase is described. In the present embodiment, a per-unit-electric-power fuel consumption decrease in the EV travel mode is an "EV effect", a per-unit-electric-power fuel consumption decrease in the MG assist mode is an "MG assist effect", and a per-unit-electric-power fuel consumption increase in the engine generation mode is an "engine generation cost".

First, the engine efficiency $\eta$ eng and the MG-INV efficiency $\eta$ ele that are respectively used for the calculation of the EV effect, the MG assist effect, and the engine generation cost are described. The engine efficiency $\eta$ eng is an efficiency of the engine 11 as a separate device (i.e., by itself or engine-only), and the MG-INV efficiency $\eta$ ele is an efficiency of a combination of the motor generator 12 and the inverter 14.

Figure 21:
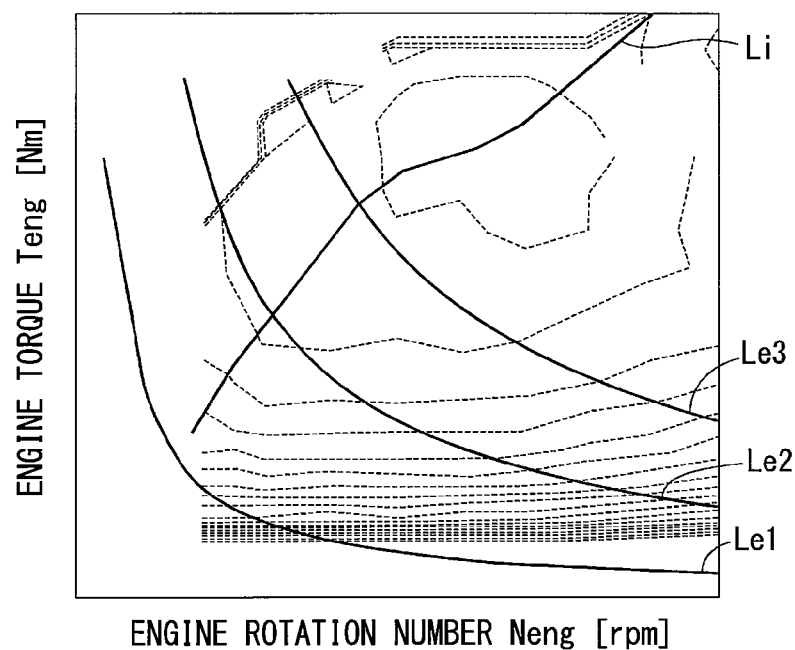
FIG. 21 is an illustration diagram of an ideal fuel consumption line of an engine in the third embodiment of the present disclosure.

FIG. 21 shows a contour line of a fuel consumption rate Ceng [g/h] in a diagram in which a horizontal axis is an engine rotation number Neng [rmp] and a vertical axis is an engine torque Teng [Nm]. Solid lines Le1, Le2, and Le3 are equi-power lines, which are connecting lines connecting equi-power points, i.e., points of the same engine power Peng. Further, a solid line Li is an ideal fuel consumption line which connects minimum fuel consumption points, i.e., the points on the equi-power lines where the fuel consumption rate Ceng falls to the minimum.

Figure 22:
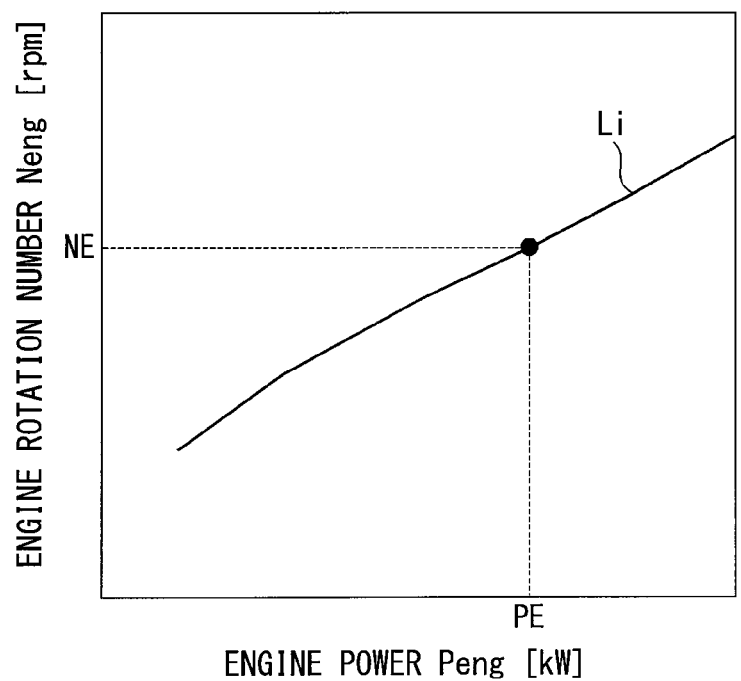
FIG. 22 is an illustration diagram of a relationship between an engine power and an engine rotation number on the ideal fuel consumption line of the engine in the first embodiment of the present disclosure.
Figure 23:
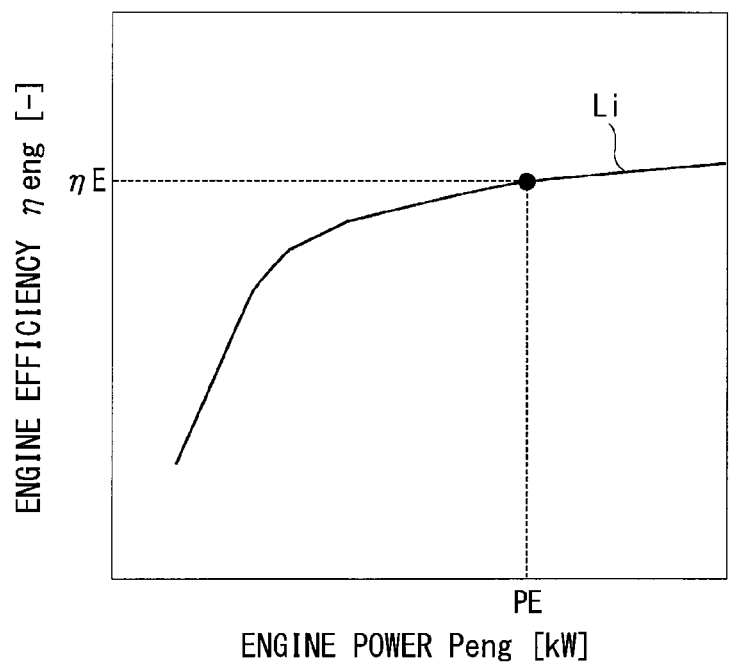
FIG. 23 is an illustration diagram of an engine efficiency on the ideal fuel consumption line of the engine in the first embodiment of the present disclosure.

FIG. 22 is a diagram of a relationship between the engine power Peng and the engine rotation number Neng based on the ideal fuel consumption line Li based on FIG. 21. FIG. 23 is a diagram of a relationship between the engine power Peng and the engine efficiency $\eta$ eng based on the ideal fuel consumption line Li based on FIG. 21.

Since the engine 11 is controlled so that the operation points of the engine 11 fall on the ideal fuel consumption line Li in the present embodiment, once the engine power Peng is determined, the operation point is determined as a single point, thereby leading to a determination of the engine rotation number Neng. Further, as shown in FIG. 23, when the engine power Peng is determined, the engine efficiency η eng is computable.

Figure 24:
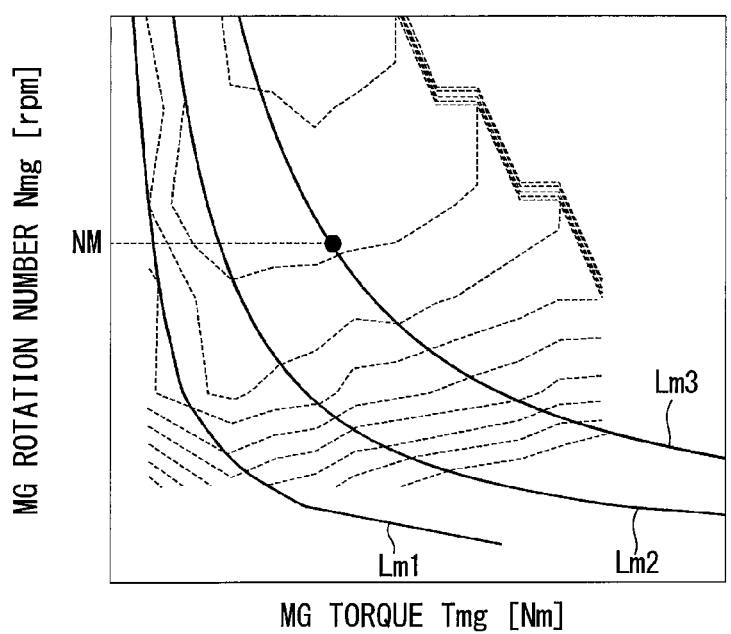
FIG. 24 is an illustration diagram of an MG-INV efficiency in the third embodiment of the present disclosure.

FIG. 24 shows a contour line (i.e., a broken line) of the MG-INV efficiency η ele [−] in a diagram in which a horizontal axis is an MG torque Tmg [Nm] and a vertical axis is an MG rotation number Nmg [rpm]. Solid line Lm1, Lm2, and Lm3 are equi-power lines, which are connecting lines connecting equi-power points, i.e., points of the same MG power Pmg.

In the present embodiment, the engine rotation number Neng is equal to the MG rotation number Nmg, when the engine rotation number Neng is determined, the MG rotation number Nmg is also determined. Further, since the engine rotation number Neng is determined based on the engine power Peng, it may also be stated that the MG rotation number Nmg is determined based on the engine power Peng.

Further, since the operation point is determined as a single point when the MG rotation number Nmg and the MG power Pmg are determined, with reference to a map of FIG. 24, the MG-INV efficiency η ele is computable.

More practically, when the engine power Peng is determined as PE as shown in FIG. 22, for example, the engine rotation number Neng is determined as NE. Further, as shown in FIG. 23, when the engine power Peng is determined as PE, the engine efficiency η eng is determined as η E.

Further, when the engine rotation number Neng is determined as NE, the MG rotation number Nmg is determined as a single value, i.e., as NM. Then, when the MG power Pmg and the MG rotation number Nmg are determined as shown in FIG. 24, the MG-INV efficiency η ele is determined as η M.

That is, in other words, when the engine power Peng and the MG power Pmg are determined, the engine efficiency η eng and the MG-INV efficiency η ele are computable.

Since the engine 11 and the motor generator 12 are separated by the first clutch 16 at the time of the EV travel, there is no relationship between the engine rotation number Neng and the MG rotation number Nmg.

Therefore, in the EV travel mode, the computation of the MG-INV efficiency η ele may be performed based on an assumption that the motor generator 12 is driven at the optimal efficiency points, where the MG-INV efficiency η ele rises to the optimal point on the equi-power line. Further, for the engine 11 and the motor generator 12 to be appropriately shifted to a clutch connected state by the connection of the first clutch 16, the motor generator 12 may be assumed to be driven at an operation point that is in consideration of the engine rotation number Neng, and the MG-INV efficiency η ele may be computed based on such an operation point.

Figure 25:
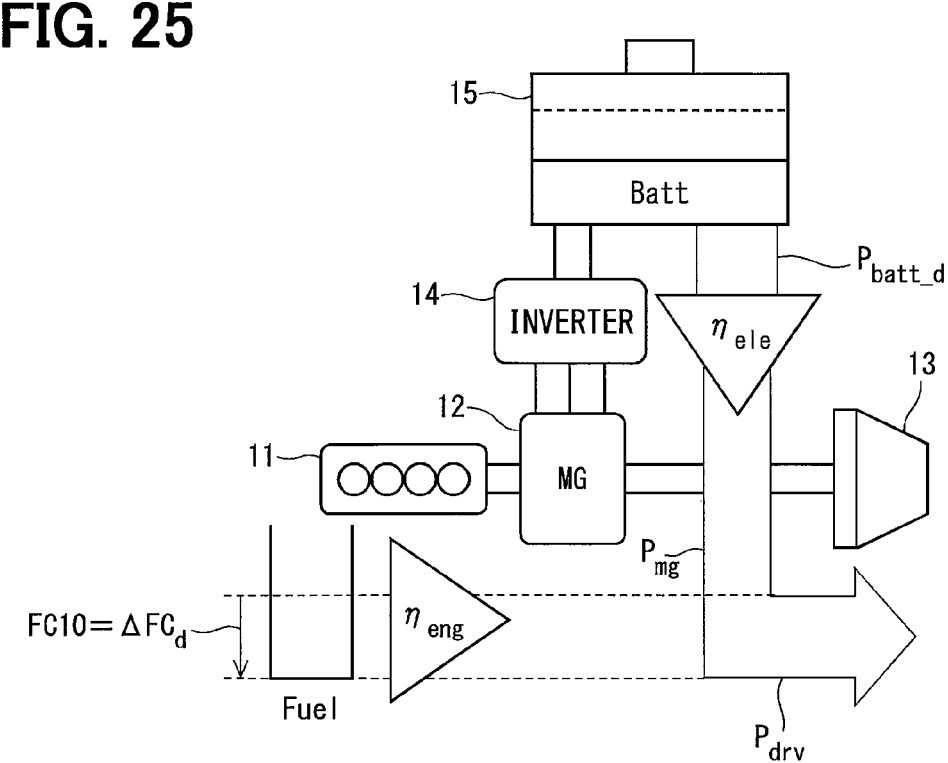
FIG. 25 is an illustration diagram of an EV effect in the third embodiment of the present disclosure.
Figure 26:
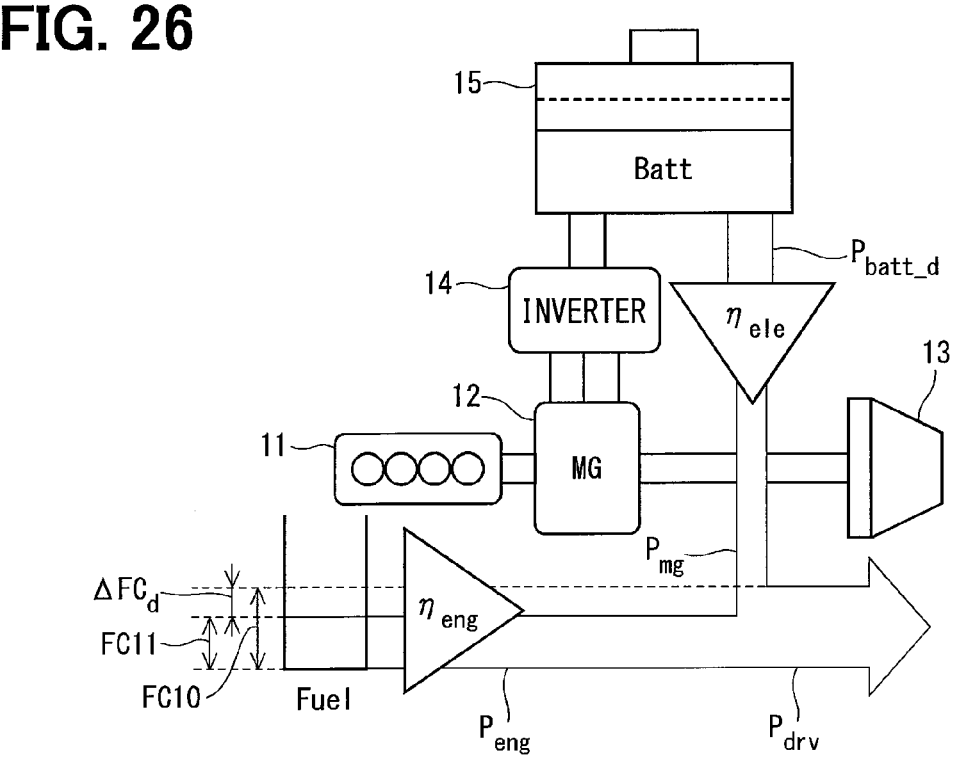
FIG. 26 is an illustration diagram of an MG assist effect in the third embodiment of the present disclosure.
Figure 27:
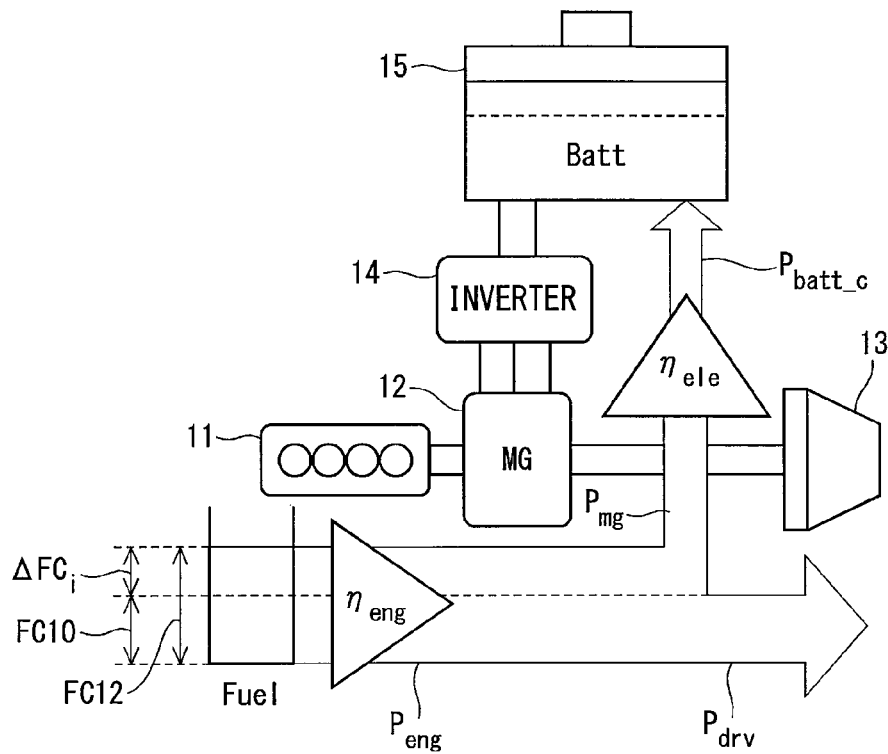
FIG. 27 is an illustration diagram of an electricity generation cost in the third embodiment of the present disclosure.

Then, the calculation methods of the EV effect, the MG assist effect, and the engine generation cost are described based on FIGS. 25-27. In FIGS. 25-27, the control section 20 is omitted from illustration. Hereafter, the per-unit-time fuel consumption decrease is designated as ΔFCd, and the per-unit-time fuel consumption increase is designated as ΔFCi.

FIG. 25 is a diagram illustrating the EV effect.

In the EV travel mode, the requested drive power Pdrv is provided as the MG power Pmg which comes from the motor generator 12 that is driven by the electric power of the main battery 15. Therefore, the requested drive power Pdrv is represented by an Equation (14) based on a consumed electric consumed electric power Pbatt_d [kW].

$$P_{drv} = P_{batt\_d} \times \eta_{ele}(P_{drv}) \quad \text{Equation (14)}$$

The term "η ele (Pdrv)" in the Equation (14) is the MG-INV efficiency at the time of outputting the requested drive power Pdrv as the MG power Pmg from the motor generator 12, and is calculated from the map shown in FIG. 24. Hereafter, the term "η ele (Px)" is considered as the MG-INV efficiency at the time of outputting a power Px as the MG power Pmg from the motor generator 12, and is considered as a value calculated from the map shown in FIG. 24.

Further, in the EV travel mode, a fuel consumption FC10 in the case of providing the requested drive power Pdrv as the engine power Peng that is generated by the drive of the engine 11 is the fuel consumption decrease ΔFCd. When the requested drive power Pdrv is provided as the engine power Peng generated by the drive of the engine 11, the requested drive power Pdrv is represented by a following Equation (15).

$$P_{drv} = \Delta FC_d \times \rho \times \eta_{eng}(P_{drv}) \quad \text{Equation (15)}$$

The term η eng (Pdrv) in the Equation (15) is the engine efficiency at the time of outputting the requested drive power Pdrv as the engine power Peng from the engine 11, and is calculated from the map shown in FIG. 23. Hereafter, "η eng (Py)" is considered as the engine efficiency at the time of outputting the power Py as the engine power Peng from the engine 11, and is considered as a value calculated from the map shown in FIG. 23.

Further, the term ρ [kJ/g] in the Equation (15) is a fuel energy density, and is a constant according to the kind of the fuel.

When the EV effect is defined by a following Equation (16), the EV effect is represented by an Equation (17) based on the Equations (14) and (15). From the Equation (4), the EV effect is computed based on the engine efficiency η eng and the MG-INV efficiency η ele.

$$EV\ \text{effect[g/s/kW]} = \frac{\text{Per-unit-time fuel consumption increase [g/s]}}{\text{Consumed electric power [kW]}} = \quad \text{Equation (16)}$$
$$\Delta FC_d / P_{batt\_d}$$

$$\Delta FC_d / P_{batt\_d} = \eta_{ele}(P_{drv}) / \eta_{eng}(P_{drv}) \times 1/\rho \quad \text{Equation (17)}$$

FIG. 26 is a diagram illustrating the MG assist effect.

In the MG assist mode, the requested drive power Pdrv is provided as (i) the engine power Peng by the drive of the engine 11 and (ii) the MG power Pmg by the drive of the motor generator 12. In the present embodiment, prior to a distribution of the requested drive power Pdrv according to the travel mode in the drive power distribution part 24, a temporary distribution of the requested drive power Pdrv is performed by the travel mode selecting part 23 according to a map operation or the like, which distributes Pdrv into the engine power Peng and the MG power Pmg, for the calculation of the fuel consumption decrease ΔFCd.

The MG power Pmg is represented by an Equation (5) based on the consumed electric power Pbatt_d.

$$P_{mg} = P_{batt\_d} \times \eta_{ele}(P_{mg}) \quad \text{Equation (18)}$$

In the MG assist mode, a difference between the fuel consumption FC10 and the fuel consumption FC11, i.e., (i)

the fuel consumption FC10 in the case of outputting the requested drive power Pdrv entirely from the engine 11 and (ii) the fuel consumption FC11 in the case of outputting the engine power Peng from the engine 11 as a result of subtraction of the MG power Pmg outputted by the motor generator 12 from the requested drive power Pdrv, is the fuel consumption decrease ΔFCd.

The fuel consumption decrease ΔFCd is represented by a following Equation (19).

$$\Delta FC_d = \frac{P_{drv}}{\eta_{eng}(P_{drv})} \times \frac{1}{\rho} - \frac{P_{drv} - P_{mg}}{\eta_{eng}(P_{drv} - P_{mg})} \quad \text{Equation (19)}$$

When the MG assist effect is defined by an Equation (20) just like the EV effect, the MG assist effect is represented by an Equation (21) based on the Equations (18) and (19). From the Equation (21), the MG assist effect is computed based on the engine efficiency η eng, the MG-INV efficiency η ele, the requested drive power Pdrv, and the MG power Pmg.

$$EV \text{ effect}[g/s/kW] = \quad \text{Equation (20)}$$
$$\frac{\text{Per-unit-time fuel consumption decrease [g/s]}}{\text{Consumed electric power [kW]}} =$$
$$\Delta FC_d / P_{batt\_d}$$

$$\frac{\Delta FC_d}{P_{batt\_d}} = \left\{ \frac{P_{drv}}{\eta_{eng}(P_{drv})} - \frac{P_{drv} - P_{mg}}{\eta_{eng}(P_{drv} - P_{mg})} \right\} \times \frac{\eta_{ele}(P_{mg})}{P_{mg} \times \rho} \quad \text{Equation (21)}$$

FIG. 27 is a diagram illustrating the engine generation cost.

In the engine generation mode, a part of the engine power Peng is used for the drive of the motor generator 12, and the electric power generated by the drive of the motor generator 12 is supplied to the main battery 15 via the inverter 14, and the main battery 15 is charged. A charge electric power Pbatt_c that is charged to the main battery 15 is represented by a following Equation (22).

$$P_{batt\_c} = P_{mg} \times \eta_{ele}(P_{mg}) \quad \text{Equation (22)}$$

In the engine generation mode, a difference between (i) the fuel consumption FC10 in the case of outputting the requested drive power Pdrv from the engine 11 and (ii) a fuel consumption FC12 in the case of outputting the MG power Pmg in addition to the requested drive power Pdrv from the engine 11 is a fuel consumption increase ΔFCi.

The fuel consumption increase ΔFCi is represented by a following Equation (23).

$$\Delta FC_i = -\frac{P_{drv}}{\eta_{eng}(P_{drv})} \times \frac{1}{\rho} + \frac{P_{drv} + P_{mg}}{\eta_{eng}(P_{drv} + P_{mg})} \times \frac{1}{\rho} \quad \text{Equation (23)}$$

When the engine generation cost is defined by a following Equation (24), the engine generation cost is represented by a following Equation (25) based on the Equations (22) and (23). The engine generation cost is computed in the same manner as the MG assist effect by a following Equation (25) based on the engine efficiency η eng, the MG-INV efficiency η ele, the requested drive power Pdrv, and the MG power Pmg.

$$\text{Engine generation cost}[g/s/kW] = \quad \text{Equation (24)}$$
$$\frac{\text{Per-unit-time fuel consumption increase [g/s]}}{\text{Charge electric power [kW]}} =$$
$$\Delta FC_i / P_{batt\_c}$$

$$\frac{\Delta FC_i}{P_{batt\_c}} = \quad \text{Equation (25)}$$
$$\left\{ -\frac{P_{drv}}{\eta_{eng}(P_{drv})} + \frac{P_{drv} + P_{mg}}{\eta_{eng}(P_{drv} + P_{mg})} \right\} \times \frac{1}{P_{mg} \times \eta_{ele}(P_{mg}) \times \rho}$$

The Equations (17), (20) and (25) are represented by the engine efficiency η eng and the MG-INV efficiency η ele which are computed based on the engine power.

That is, in other words, the EV effect, the MG assist effect, and the engine generation cost are computable based on the engine efficiency η eng and the MG-INV efficiency η ele.

Further, in the EV travel mode, a following Equation (26) is valid.

$$P_{drv} = P_{mg} \quad \text{Equation (26)}$$

That is, in other words, the EV effect may be computed based on the requested drive power Pdrv or the MG power Pmg based on the Equation (17).

Further, a following Equation (27) is valid in the MG assist mode.

$$P_{drv} = P_{eng} + P_{mg} \quad \text{Equation (27)}$$

Further, a following Equation (28) is valid in the engine generation mode. Equation (28)

$$P_{drv} = P_{eng} - P_{mg}$$

One of the requested drive power Pdrv, the engine power Peng, and the MG power Pmg is convertible from the other two based on the Equations (27) and (28).

Further, with reference to the Equations (21) and (25), the MG assist effect and the engine generation cost are computed based on at least two of the requested drive power Pdrv, the engine power Peng, and the MG power Pmg.

The EV effect and the MG assist effect are fuel consumption decrease indicators, which respectively indicate a greater fuel consumption decrease when their values are larger. Therefore, in the present embodiment, after computing the EV effect and the MG assist effect, (i) when the MG assist effect is greater than the EV effect (S105:YES in FIG. 20), the travel mode is shifted into the MG assist mode, and (ii) when the EV effect is equal to or greater than the MG assist effect (S105:NO), the travel mode is shifted into the EV travel mode. In such manner, the electrical energy of the main battery 15 is used highly efficiently, and the fuel consumption is decreased.

Figure 28:
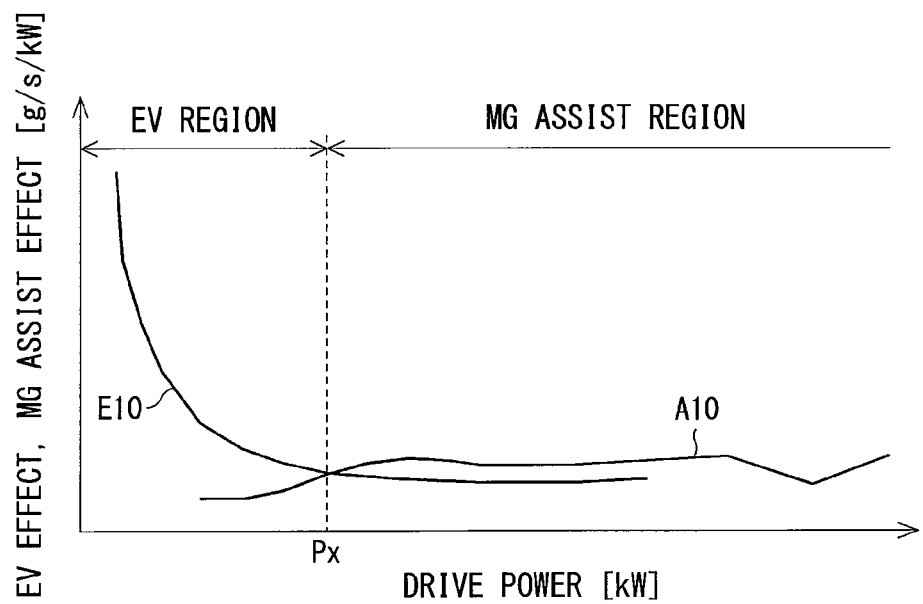
FIG. 28 is an illustration diagram of a relationship between the EV effect and the MG assist effect in the third embodiment of the present disclosure.

A concrete example of the EV effect and the MG assist effect is shown in FIG. 28.

In FIG. 28, assuming that the MG power Pmg from the motor generator 12 is constant, a solid line E10 represents the EV effect, and a solid line A10 represents the MG assist effect.

As shown in FIG. 28, when the requested drive power Pdrv is below Px, the EV effect is greater than the MG assist effect. When an "EV region" is defined as a region where the EV effect is greater than the MG assist effect, a greater fuel consumption decrease effect is expected from the EV travel mode travel than from the MG assist mode travel, based on an assumption that the same amount of electric power is consumed, which results in a lower fuel consumption for the same distance of travel. Therefore, in the EV region, the EV travel mode is selected.

When the requested drive power Pdrv is greater than Px, the MG assist effect is greater than the EV effect. When an "MG assist region" is defined as a region where the MG assist effect is greater than the EV effect, a greater fuel consumption decrease effect is expected from the MG assist mode travel than from the EV travel mode travel, based on an assumption that the same amount of electric power is consumed, which results in a lower fuel consumption for the same distance of travel. Therefore, in the MG assist region, the MG assist mode is selected.

As fully described in the above, the control section 20 of the present embodiment controls the vehicle 90 which is a hybrid vehicle having the engine 11, the motor generator 12, the main battery 15, the inverter 14, and the transmission 13. The motor generator 12 rotates at a preset ratio relative to the engine rotation number Neng, when connected to the engine 11. The main battery 15 delivers and receives the electric power to and from the motor generator 12. The inverter 14 is disposed at a position between the main battery 15 and the motor generator 12. The transmission 13 changes speed and transmits the drive power of the engine 11 and the motor generator 12 to the driving wheel 95.

The following processes are performed in the travel mode selecting part 23.

Based on the engine power Peng which is the drive power outputted from the engine 11 and the ideal fuel consumption line which indicates ideal fuel consumption information, the engine efficiency η eng for the engine 11 by itself is computed. Further, based on the MG power Pmg which is the drive power outputted from the motor generator 12, the MG-INV efficiency η ele which is a total efficiency of the motor generator 12 and the inverter 14 is computed. Then, based on the engine efficiency η eng and the MG-INV efficiency η ele, the per-unit-electric-power fuel consumption decrease ΔFCd or the per-unit-electric-power fuel consumption increase ΔFCi is computed for every travel mode.

According to the present embodiment, based on the engine efficiency η eng and the MG-INV efficiency η ele, the per-unit-electric-power fuel consumption decrease ΔFCd or the per-unit-electric-power fuel consumption increase ΔFCi is computed for every travel mode. Further, the engine efficiency η eng is computed based on the engine power Peng, and the MG-INV efficiency η ele is computed based on the MG power Pmg. Namely, if mapping equations for computing the engine efficiency η eng from the engine power Peng and for computing the MG-INV efficiency η ele from the MG power Pmg are known, based on the engine power, the per-unit-electric-power fuel consumption decrease ΔFCd or the per-unit-electric-power fuel consumption increase ΔFCi is appropriately computable.

Further, the fuel consumption decrease ΔFCd or the fuel consumption increase ΔFCi for every travel mode may be computed based on a measurement of an actual travel of the vehicle, such an actual measurement demands time and special equipment, in addition to the control of many emission parameters and the like that affect the load of the accessory devices, for the improved accuracy.

On the other hand, in the present embodiment, the fuel consumption decrease ΔFCd or the fuel consumption increase ΔFCi for every travel mode is computed based on the engine power, the fuel consumption decrease ΔFCd for every travel mode or the fuel consumption increase ΔFCi can be computed with a more simple configuration compared with the actual measurement case and without using an actual vehicle.

In the travel mode selecting part 23, at least one of the EV effect, the MG assist effect, and the engine generation cost is computed.

The EV effect is the fuel consumption decrease ΔFCd in case that the travel mode is the EV travel mode in which the requested drive power Pdrv is computed based on driver operation information and vehicle speed information is output as the MG power Pmg.

The MG assist effect is the fuel consumption decrease ΔFCd in case that the travel mode is the MG assist mode in which the requested drive power Pdrv is output as a combination of the engine power Peng and the MG power Pmg.

The engine generation cost is the fuel consumption increase ΔFCi in case that the travel mode is the engine generation mode in which the requested drive power Pdrv is output as the engine power Peng and the engine power Peng is used for the drive of the motor generator 12 for generating the electric power.

Further, by computing the EV effect and the MG assist effect, the travel mode is determined based on the comparison result between the EV effect and the MG assist effect. That is, the travel mode is selected for maximizing the fuel consumption decrease effect and for raising the efficiency of the use of the electric energy. Such a selection of the travel mode improves the fuel consumption efficiency.

In the travel mode selecting part 23, the MG rotation number Nmg which is the number of rotation of the motor generator 12 is computed from the engine rotation number Neng that is computed based on the engine power Peng and the ideal fuel consumption information, and the MG-INV efficiency η ele is computed based on the computed MG rotation number Nmg and the MG power Pmg.

In the present embodiment, when the vehicle is traveling in a mode other than the EV travel mode, the MG rotation number Nmg is uniquely determined based on the engine rotation number Neng, indicating that the MG rotation number Nmg is determined by the engine power Peng. Therefore, when the engine power Peng and the MG power Pmg are both determined, the MG-INV efficiency is appropriately computable.

In the present embodiment, the transmission 13 is a continuously variable transmission. Thereby, the operation point of the engine 11 is controllable to fall on the ideal fuel consumption line, enabling the improvement of the fuel consumption efficiency.

In the present embodiment, the travel mode selecting part 23 corresponds to an "engine efficiency calculator", an "MG-INV efficiency calculator", a "power efficiency calculator", and a "travel mode selector".

Further, S108 in FIG. 20 corresponds to a process that provides a function of an "engine efficiency calculator", an "MG-INV efficiency calculator", and a "power efficiency calculator", and S110 and S111 in FIG. 20 correspond to a process that provides a function of a "travel mode selector".

(Other Embodiments)

Although the present disclosure has been fully described in connection with preferred embodiment thereof with reference to the accompanying drawings, it is to be noted that various changes and modifications will become apparent to those skilled in the art. The examples follow.

(a) According to the first and second embodiments, the surplus electric energy is the difference between the generated electric power and the used energy, and the generated electric power is the electric power by the deceleration regeneration. Specifically, the generated electric power by the deceleration regeneration is an integration value of a deceleration regeneration electric power Preg for the past preset number of times.

In other embodiments, the generated electric power by the deceleration regeneration may include, in addition to the integration value of the deceleration regeneration electric power Preg for the past preset number of times, a predicted energy obtained/foreseen by the future deceleration regeneration based on the vehicle speed information. That is, the predicted energy by the future regeneration based on the vehicle speed information may also be counted as the surplus electric energy. In such manner, the EV extended region has an increased period of EV travelable time, thereby enabling the improvement of the fuel consumption efficiency to a further extent.

Further, in the first and second embodiments, in the energy integration calculations, i.e., in the deceleration regeneration electric energy integration, the engine generated electric energy integration, the EV basic consumed energy integration, and the EV extension energy integration, the integration value comes from a past preset number of times.

In other embodiments, the above-mentioned calculation may be performed for having a moving average of a preset number of times. Further, the integration value may come from a preset duration of time, or from a preset travel distance. Further, the calculation may have variable calculation range in every calculation occasion.

(b) According to the first and second embodiments, the engine generated power cost used for the determination of a travel mode is a value when the engine generated electric power Pgen used for the electric power generation in the motor generator is the constant value Pc.

In other embodiments, the engine generated power cost used for the determination of a travel mode may be a variable value according to the engine generated electric power Pgen. That is, although the engine generated power cost is defined as one line (i.e., a map) in FIGS. 10 and 17, the cost may be defined as two or more lines (i.e., maps) according to the engine generated electric power Pgen, for example.

(c) According to the first to third embodiments, the first clutch is provided in between the engine and the motor generator. In other embodiments, in addition to the first clutch, a drive power transmission device such as a belt, a gear, a chain and the like may be disposed in between the engine and the motor generator, and thee engine and the motor generator may be connected via such drive power transmission device. Further, as long as the engine rotation number and the MG rotation number are configured to have a certain ratio, the drive power transmission device may have a deceleration unit and/or an acceleration unit. Further, the first clutch may be omitted.

(d) Although the transmission in the first to third embodiments is a continuously variable transmission, the transmission may be provided as a multi-speed transmission in other embodiments. When the transmission is a multi-speed transmission, the ideal fuel consumption information is set up according to the number of speeds.

(e) According to the first embodiment described above, the EV effect and the engine generated power cost are stored as a map in advance. In other embodiments, the EV effect and the engine generated power cost may be computed by using the Equations (4), (8) for every travel occasion.

According to the third embodiment described above, the EV effect, the MG assist effect, and the engine generation cost are computed by using the Equations (17), (21), and (25). In other embodiments, the computation results from the Equations (17), (21), and (25) may be stored as a map in advance, and a map operation may be used to compute the EV effect, the MG assist effect, and the engine generation cost. In such case, the map may be generated by using other devices. The same applies to the second embodiment.

Further, in the third embodiment, a calculation of the engine generation cost may be omitted, because the engine generation cost is not used for the selection of the travel modes.

(f) In the first to third embodiments, the vehicle control apparatus is provided as having one control section. In other embodiments, the vehicle control apparatus may be provided as having many control sections, such as an engine control section that controls an engine, and an MG control section that controls a motor generator, for example.

(g) In the third embodiment, an electricity storage part is constituted by the secondary battery. In other embodiments, the electricity storage part may be replaced with other device, as long as it is chargeable and dischargeable, such as an electric double layer capacitor, or the like.

Such changes, modifications, and summarized schemes are to be understood as being within the scope of the present disclosure as defined by appended claims.

What is claimed is:
1. A vehicle control apparatus for controlling a hybrid vehicle that has an engine, a motor generator, and an electricity storage part that charges and discharges electric power to and from the motor generator, the vehicle control apparatus comprising:
a processing system, including a computer processor and memory, the processing system being configured to at least perform:
a requested drive power calculator calculating a requested drive power based on driver operation information and vehicle speed information; and
a travel mode selection for selecting one of plural travel modes as a travel mode of the hybrid vehicle, the travel modes including:
an EV travel mode in which the requested drive power is output from the motor generator,
an engine travel mode in which the requested drive power is output from the engine, and
an engine generation mode in which the requested drive power is output from the engine while the engine drives the motor generator; and
control of the hybrid vehicle based on ht selected one of he plural travel modes, wherein
a fuel consumption decrease effect, which is an EV effect that is calculated based on (i) a fuel consumption decrease amount and (ii) a consumed electric power when the motor generator outputs the requested drive power,
a fuel consumption increase cost, which is an engine generated power cost that is calculated based on (i) a fuel consumption increase amount and (ii) a charge electric power when the engine drives the motor generator to generate an electric power, and the travel mode selector selects
(A) the EV travel mode as the travel mode of the hybrid vehicle when the EV effect is greater than the engine generated power cost,
(B) the EV travel mode as the travel mode of the hybrid vehicle when the engine generated power cost is equal to or greater than the EV effect and a surplus electric energy is available, or

(C) one of the engine travel mode and the engine generation mode when the engine generated power cost is equal to or greater than the EV effect and no surplus electric energy is available.

2. The vehicle control apparatus of claim 1, wherein the engine generated power cost is based on the requested drive power.

3. The vehicle control apparatus of claim 1, wherein the engine generated power cost is a maximum value when the requested drive power is within a preset range.

4. The vehicle control apparatus of claim 2, wherein the engine generated power cost is a constant value based on an engine generated electric power that is constant, and the constant value is defined as a value that maintains a rate of change of the engine generated power cost versus the engine generated power below a predetermined value.

5. The vehicle control apparatus of claim 1, wherein surplus electric energy includes a predicted energy that is to be obtained from future deceleration regeneration electric power based on the vehicle speed information.

6. The vehicle control apparatus of claim 1, wherein the travel mode selection unit selects the engine travel mode as the travel mode of the hybrid vehicle when (i) the engine generated power cost is equal to or greater than the EV effect and (ii) there is no surplus electric energy or no shortage of electric energy, and the travel mode selection unit selects the engine generation mode as the travel mode of the hybrid vehicle when (i) the engine generated power cost is equal to or greater than the EV effect and (ii) there is a shortage of electric energy.

7. The vehicle control apparatus of claim 1, wherein the fuel consumption decrease amount for the calculation of the EV effect is calculated as an amount of fuel consumption based on an engine efficiency when the requested drive power is output from the engine, and the consumed electric power for the calculation of the EV effect is calculated based on the requested drive power and a motor generator efficiency.

8. The vehicle control apparatus of claim 1, wherein the fuel consumption increase amount for the calculation of the engine generated power cost is calculated based on an engine efficiency as a difference between (i) an amount of fuel consumption when the requested drive power and the engine generated electric power for the drive of the motor generator are both output from the engine and (ii) an amount of fuel consumption when the requested drive power is output from the engine, and the charge electric power used to calculate the engine generated power cost is calculated based on the engine generated electric power and a motor generator efficiency.

9. The vehicle control apparatus of claim 7, wherein the engine efficiency and an engine rotation number are calculated based on the output of the engine and ideal fuel consumption information of the engine, and the motor generator efficiency is determined based on a motor generator rotation number and the output of the motor generator.

10. The vehicle control apparatus of claim 1, wherein the hybrid vehicle has a transmission transmitting the drive power from the engine and the motor generator to a drive wheel, and an engine rotation number and the motor generator rotation number are set to rotate at a preset ratio.

11. The vehicle control apparatus of claim 10, wherein the transmission is a continuously variable transmission.

* * * * *